United States Patent [19]

Fukumura et al.

[11] Patent Number: 5,795,930

[45] Date of Patent: *Aug. 18, 1998

[54] WATER INSOLUBLE AMMONIUM POLYPHOSPHATE POWDER FOR FLAME-RETARDANT THERMOPLASTIC POLYMER COMPOSITION

[75] Inventors: Tikashi Fukumura, Kitakyushu; Masuo Iwata, Yokohama; Noriaki Narita, Yokohama; Kouji Inoue, Yokohama; Masaya Tanaka, Kitakyushu; Mika Seki, Yokohama; Ryoji Takahashi, Tokyo, all of Japan

[73] Assignee: Chisso Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 464,605

[22] PCT Filed: Dec. 28, 1994

[86] PCT No.: PCT/JP94/02294

§ 371 Date: Aug. 3, 1995

§ 102(e) Date: Aug. 3, 1995

[30] Foreign Application Priority Data

Dec. 28, 1993 [JP] Japan ................. 5-354089
Dec. 28, 1993 [JP] Japan ................. 5-354672
Apr. 6, 1994 [JP] Japan ................. 6-93721

[51] Int. Cl.$^6$ .................. C08K 9/04; C08K 34/92
[52] U.S. Cl. .................. 524/100; 524/96; 524/416; 524/430; 524/437
[58] Field of Search .................. 524/416, 100, 524/101, 96, 436, 430, 437; 252/607, 609

[56] References Cited

U.S. PATENT DOCUMENTS

| | | |
|---|---|---|
| 3,926,990 | 12/1975 | Fukuba et al. . |
| 3,953,565 | 4/1976 | Mizutani et al. ........... 524/430 |
| 4,193,945 | 3/1980 | Bertelli et al. . |
| 4,198,493 | 4/1980 | Marciandi . |
| 4,467,056 | 8/1984 | Staendeke, et al. . |
| 4,504,610 | 3/1985 | Fontanelli et al. . |
| 4,639,331 | 1/1987 | Elsner et al. . |
| 4,719,045 | 1/1988 | Ogawa et al. . |
| 4,727,102 | 2/1988 | Scarso ........... 524/100 |
| 4,772,642 | 9/1988 | Staendeke ........... 523/205 |
| 4,853,424 | 8/1989 | Staendeke et al. . |
| 4,871,477 | 10/1989 | Dimanshteyn ........... 252/600 |
| 4,871,795 | 10/1989 | Pawar . |
| 4,957,950 | 9/1990 | Staendeke et al. . |
| 4,966,931 | 10/1990 | Akitaya et al. . |
| 5,130,357 | 7/1992 | Akitaya et al. . |
| 5,200,445 | 4/1993 | Cipolli et al. . |
| 5,213,783 | 5/1993 | Fukumura et al. . |
| 5,223,560 | 6/1993 | Cipolli et al. ........... 524/100 |
| 5,344,855 | 9/1994 | Narita et al. ........... 524/416 |
| 5,430,080 | 7/1995 | Iwata et al. ........... 524/416 |
| 5,430,081 | 7/1995 | Ohmae et al. ........... 524/436 |
| 5,700,575 | 12/1997 | Iwata et al. ........... 428/403 |

FOREIGN PATENT DOCUMENTS

| | | |
|---|---|---|
| 0014463 | 8/1980 | European Pat. Off. . |
| 0180795 | 5/1986 | European Pat. Off. . |
| 326082 | 8/1989 | European Pat. Off. . |
| 0614936 | 9/1994 | European Pat. Off. . |
| 4139241 | 5/1992 | Japan . |
| 4142348 | 5/1992 | Japan . |
| 4142352 | 5/1992 | Japan . |
| 4146944 | 5/1992 | Japan . |
| 5310997 | 11/1993 | Japan . |
| 5331322 | 12/1993 | Japan . |

OTHER PUBLICATIONS

English Abstract of Japanese Patent No. JP 1268738, Oct. 26, 1989.
English Abstract of Japanese Patent No. JP 3009937, Jan. 17, 1991.
English Abstract of Japanese Patent No. JP 61103962, May 22, 1986.
English Abstract of Japanese Patent No. JP 77039930, Oct. 07, 1977.

*Primary Examiner*—Veronica P. Hoke
*Attorney, Agent, or Firm*—Leydig, Voit & Mayer, Ltd.

[57] ABSTRACT

A flame-retardant thermoplastic polymer composition which inhibits the bleeding of ammonium polyphosphate onto the surface of a molded article include components (A), (B), (C), and (D), wherein includes an oxygen-containing solid compound containing an element of Group II, Group III or Group IV of the periodic table, (B) includes a triazine ring-containing organic compound, (C) includes an ammonium polyphosphate powder, a melamine-coated ammonium polyphosphate powder and a powder of a water-insolubilized, melamine-coated ammonium polyphosphate powder, and (D) includes a thermoplastic polymer.

46 Claims, 2 Drawing Sheets

5,795,930

WATER INSOLUBLE AMMONIUM POLYPHOSPHATE POWDER FOR FLAME-RETARDANT THERMOPLASTIC POLYMER COMPOSITION

TECHNICAL FIELD

The present invention relates to a thermoplastic polymer composition showing excellent flame retardance, more particularly to a thermoplastic polymer composition of high flame retardance which comprises (A) an oxygen-containing solid compound containing an element of Group II, Group III or Group IV of the periodic table, (B) a nitrogen-containing organic compound, (C1) an ammonium polyphosphate powder or (C2) a melamine-coated ammonium polyphosphate powder and (D) a thermoplastic polymer, in specific amounts.

The present invention also relates to compositions of thermoplastic polymers (B), which contain, in place of the component (C1) or (C2) of the above-mentioned composition, a water-insoluble ammonium polyphosphate powder obtained by altering the structure of a coat of the melamine-coated ammonium polyphosphate (C2) to crosslinked structure, and which are almost free from bleeding phenomenon even when exposed to an atmosphere of high temperature and high humidity and shows satisfactory flame retardance.

Furthermore, the invention relates to thermoplastic resin compositions which are formed from at least the water-insoluble ammonium polyphosphate powder mentioned above, (B) nitrogen-containing organic compounds and (D) thermoplastic resins and which are excellent in bleed resistance and flame retardance.

Moreover, the invention relates to the water-insoluble ammonium polyphosphate powders mentioned above (at least one kind selected from C3, C4 and C5) and processes for preparing the same.

BACKGROUND ART

Thermoplastic polymers have been heretofore used in various fields such as fields of industrial and domestic electrical appliances, architecture, house furnishings, automobile parts, etc., because they are advantageous in sanitary viewpoint, processability, chemical resistance, weathering resistance, electrical properties and mechanical strength. Moreover, the use application of the thermoplastic polymers has been extended. With extension of their use application, flame retardance has been required for the thermoplastic polymers, and such requirement becomes severer and severer. Especially in recent years, it is regarded as a problem that a flame-retardant resin composition obtained by adding a halogen-containing compound to a thermoplastic polymer or a flame-retardant resin composition obtained by adding a halogen-containing compound and antimony oxide to a thermoplastic polymer, which are the mainstream of the flame retarding technique conventionally used, generate halogenous gas when they are burned or molded. Therefore, a flame-retardant resin composition which generates no halogenous gas during burning or molding has been demanded.

To meet such demand, in recent studies, there has been proposed a method of adding, as an inorganic flame retardant, a specific metallic hydrate which is decomposed or dehydrated by the endothermic reaction at the combustion temperature of the resin to inhibit combustion of the resin. In this case, however, the flame retardance effect of the metallic hydrate is extremely low, so that the metallic hydrate must be used in a large amount to obtain a desired flame-retardant resin composition. As a result, the resulting composition is reduced in the molding processability, and besides, the molded article obtained therefrom is deteriorated in various properties such as mechanical strength. In order to cope with various problems caused by the use of the metallic hydrate in a large amount, it has been proposed to further add an inorganic compound.

For example, there are proposed the addition of molybdenum or a molybdenum compound (Japanese Patent Laid-Open Publication No. 268738/1989) and the addition of silicon carbide whisker (Japanese Patent Laid-Open Publication No. 9937/1991). However, even if an inorganic compound is further added to the flame-retardant resin composition containing metallic hydrate as a main flame retardant, new problems caused by the use of a large amount of a flame retardant arise, and the problems have not been fundamentally solved yet.

Also proposed recently is a flame-retardant resin composition obtained by adding ammonium polyphosphate in combination with one or more nitrogen-containing organic compounds which are thermally decomposed to generate nonflammable gas (water, carbon dioxide, ammonia, nitrogen, etc.) and carbonaceous residue.

For example, there has been proposed a flame-retardant composition comprising a polymer or oligomer of 1,3,5-triazine derivative and ammonium polyphosphate (Japanese Patent Laid-Open Publication No. 147050/1984, EP-0475418). However, the flame-retardant resin composition obtained by adding ammonium polyphosphate and the nitrogen-containing organic compound in combination is still insufficient in flame retardance, though it shows higher flame retardance even in the case of using the flame retardant in a small amount, as compared with the flame-retardant resin composition containing metallic hydrate as the main flame retardant.

Further, Japanese Patent Laid-Open Publication No. 146452/1977 discloses a flame-retardant composition comprising ammonium polyphosphate and a reaction product of aldehyde and a nitrogen compound containing >C=O group, >C=S group or >NH inserted in the ring structure; Japanese Patent Laid-Open Publication No. 129435/1980 discloses a flame-retardant composition comprising ammonium polyphosphate and a reaction product of benzylguanamine and aldehyde; and Japanese Patent Laid-Open Publication No. 53156/1979 discloses a flame-retardant composition comprising ammonium polyphosphate and a derivative of isocyanuric acid.

Japanese Patent Laid-Open Publication No. 14277/1989 proposes, as a composition using flame retardants other than the nitrogen-containing compounds, a flame-retardant composition comprising a high-viscosity silicone oil, a silicone resin, polyhydric alcohol and ammonium polyphosphate.

In the molded articles obtained from the conventional flame-retardant compositions mentioned above, however, that ammonium polyphosphate seriously bleeds out on the surface of the molded article. This takes place under the conditions of high temperature and high humidity such as in the wet season, though these compositions exert a high flame retardance effect. The reason is that the ammonium polyphosphate is hygroscopic, water-soluble and easily hydrolyzed because of its chemical structure.

In addition, the ammonium polyphosphate more easily undergoes hydrolysis due to the high hygroscopicity of the nitrogen-containing compound described in the aforementioned EP-0475418. Therefore, the molded article obtained from the flame-retardant resin composition containing such a nitrogen-containing compound is markedly reduced in surface electrical resistance. As a result, such composition cannot be used as an electrical insulating material under the conditions of high temperature and high humidity.

Furthermore, the ammonium polyphosphate is poor in hydrolytic stability. To improve the hydrolytic stability, research have been conducted. Japanese Patent Publications No. 15478/1978 and No. 39930/1977 disclose a process to obtain hydrolytic-stable ammonium polyphosphate by allowing water-insoluble melamine to react with ammonium polyphosphate, but the resulting ammonium polyphosphate is still insufficient in hydrolytic stability.

Japanese Patent Laid-Open Publication No. 103962/1986 discloses a process for preparing a hydrolytic-stable finely divided flame-resistant agent, which comprises curing ammonium polyphosphate and a melamine-formaldehyde resin in a suspension. However, in the course of curing the resin component in the suspension, agglomeration of resin particles takes place thereby making the particle diameter larger. As a result, if the finely divided flame-resistant agent is added to thermoplastic resins, thermosetting resins, paints, paper, etc. as one component of flame retardants, the resulting articles are reduced in mechanical strength.

SUMMARY OF THE INVENTION

It is a first object of the invention to provide a thermoplastic polymer composition which shows excellent flame retardance in spite of a low content of a flame retardant. The present inventors have discovered a flame-retardant thermoplastic polymer composition which exhibits excellent flame retardance even if a flame retardant is used in a small amount, and they have found that the aforementioned problem can be solved by adding a small amount of an oxygen-containing solid compound containing an element of Group II, Group III or Group IV of the periodic table to a flame-retardant composition comprising a powder of ammonium polyphosphate (C1) or a powder of melamine-coated ammonium polyphosphate (C2) and a nitrogen-containing organic compound (B). The present inventors have made further studies based on this finding and accomplished the present invention.

It is a second object of the invention to provide a flame-retardant polymer composition which comprises a water-insoluble ammonium polyphosphate obtained by allowing a powder of melamine-coated ammonium polyphosphate (C2) to react with a compound reactive to an active hydrogen in the melamine molecule (the compound being referred to as "crosslinking agent" hereinafter), the nitrogen-containing organic compound (B) and the thermoplastic polymer (D). This flame-retardant polymer composition shows such a high bleed resistance that bleeding does not take place even in an atmosphere of high temperature and high humidity.

The present inventors have studied to attain the second object, and they have found that the aforementioned requirement is satisfied with a molded article obtained from a flame-retardant polymer composition which comprises a powder of ammonium polyphosphate having been modified to be water-insoluble by means of the surface crosslinking reaction (hereinafter sometimes referred to as "water-insoluble ammonium polyphosphate of the invention"), in place of the conventional ammonium polyphosphate powder (C1 or C2), the nitrogen-containing compound (B) and the thermoplastic polymer (D). As a result of further studies, the present inventors have created a flame-retardant polymer composition which uses a water-insoluble ammonium polyphosphate powder in place of the component (C1) or (C2) in the above-mentioned flame-retardant composition to attain the first object of the invention.

It is a third object of the invention to realize the first object and the second object at the same time, and to provide a flame-retardant polymer composition which exhibits excellent flame retardance even if a flame retardant is used in a small amount and which shows such a high bleed resistance so that bleeding does not take place even in an atmosphere of high temperature and high humidity.

In order to attain the third object, the water-insoluble ammonium polyphosphate powder is used in place of the ammonium polyphosphate powder (C1) in the above-mentioned flame-retardant polymer composition to attain the first object of the invention.

BEST MODE FOR CARRYING OUT THE INVENTION

Figure 1:
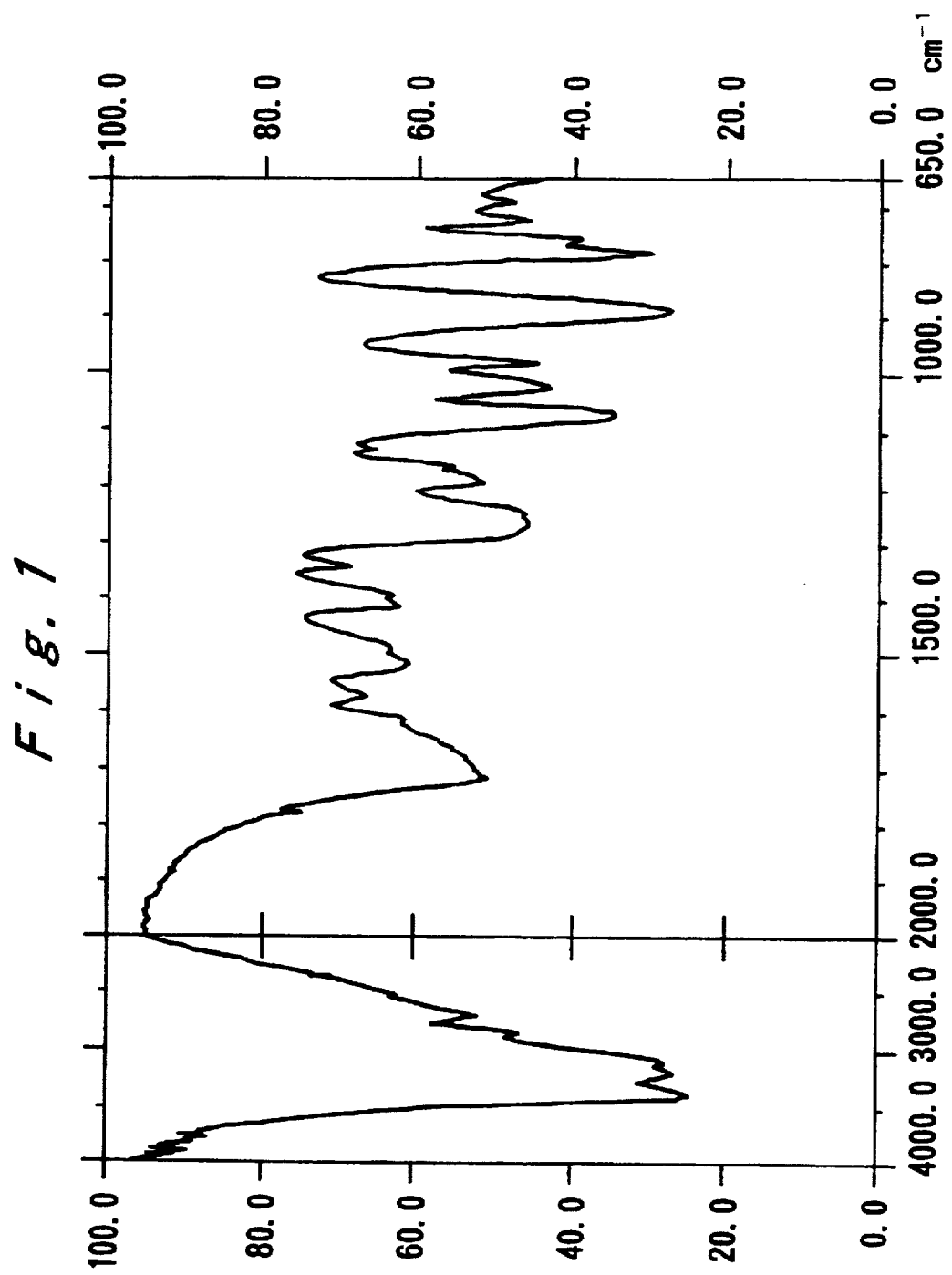
FIG. 1 shows an infrared spectrum of a surface of a water-insoluble ammonium polyphosphate powder obtained in Example 28.

The present invention includes the following:

1. A flame-retardant thermoplastic polymer composition comprising:
   (A) an oxygen-containing solid compound containing an element belonging to Group II, Group III or Group IV of the periodic table, in an amount of 0.1 to 5% by weight,
   (B) a nitrogen-containing organic compound in an amount of 1 to 20% by weight,
   (C) at least one powder selected from an ammonium polyphosphate powder represented by the following formula [I], a melamine-coated ammonium polyphosphate powder and a water-insoluble ammonium polyphosphate powder, in an amount
   (D) a thermoplastic polymer in an amount of 88.9 to 35% by weight, the total amount of said components (A), (B), (C) and (D) being 100% by weight;

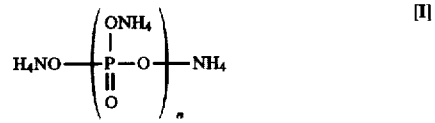

wherein n is a number of not less than 2.

2. The flame-retardant thermoplastic polymer composition as described in the above item 1, wherein the element belonging to Group II, Group III or Group IV of the periodic table is at least one element selected from Ca, Ba, Sr, Mg, Al, Si, Zn, Cd, Ti, Zr and Sn.

3. The flame-retardant thermoplastic polymer composition as described in the above item 1 or 2, wherein the oxygen-containing solid compound is at least one compound selected from hydroxides, basic carbonates, carbonates, carbonate hydrates, silicates, silicate hydrates, oxides, oxide hydrates and complexes composed of two or more kinds thereof.

4. The flame-retardant thermoplastic polymer composition as described in any one of the above items 1 to 3, wherein the oxygen-containing solid compound has a mean particle diameter of not more than 10 μm.

5. The flame-retardant thermoplastic polymer composition as described in any one of the above items 1 to 4, wherein the nitrogen-containing organic compound is a homopolymer and/or a copolymer, each comprising constituent units represented by the following formula |II|:

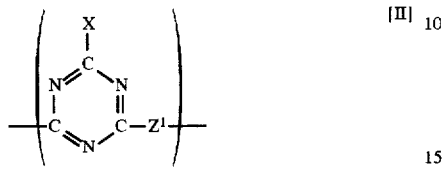

wherein X and $Z^1$ are each a group bonded to a triazine skeleton through a nitrogen atom; X is an alkylamino group represented by —$NHR^1$ or —$NR^2R^3$, said $R^1$, $R^2$ and $R^3$ each being a linear or branched alkyl group having 1 to 6 carbon atoms ($R^2$ and $R^3$ may be different from each other), a morpholino group, a piperidino group or a hydroxyalkylamino group represented by —$NHR^4$ or —$NR^5R^6$, said $R^4$, $R^5$ and $R^6$ each being a linear or branched hydroxyalkyl group having 2 to 6 carbon atoms ($R^5$ and $R^6$ may be different from each other); and $Z^1$ is a divalent group of piperazine, a divalent group represented by —$HN(CH_2)_m$NH— (m is a number of 2 to 6) or a group represented by —$NR^7(CH_2)_nR^8N$— (n is a number of 2 to 6), $R^7$ and $R^8$ being a linear or branched alkyl group having 1 to 6 carbon atoms or a hydroxyethyl group and at least one of said $R^7$ and $R^8$ being a hydroxyethyl group.

6. The flame-retardant thermoplastic polymer composition as described in any one of the above items 1 to 5, wherein the nitrogen-containing organic compound is a product obtained by the reaction of cyanuric chloride with diamine.

7. The flame-retardant thermoplastic polymer composition as described in any one of the above items 1 to 6, wherein the thermoplastic polymer is at least one polymer selected from olefin resins, styrene resins and thermoplastic elastomers.

8. Flame-retardant thermoplastic polymer compositions comprising:
(C) a water-insoluble ammonium polyphosphate powder in an amount of 10 to 40% by weight, said powder being obtained by coating surfaces of ammonium polyphosphate particles with a crosslinked structure formed by the reaction of an active hydrogen with compounds having a functional group reactive to the active hydrogen, said active hydrogen serving to form an amino group of a melamine molecule present within a coated layer of particles of melamine-coated ammonium polyphosphate (C2),
(B) nitrogen-containing organic compounds in amounts of 1 to 20% by weight, and
(D) thermoplastic polymers in amounts of 89 to 40% by weight,
the total amount of said components (C), (B) and (D) being 100% by weight.

9. The flame-retardant thermoplastic polymer compositions as described in the above item 8, wherein the compounds having a functional group reactive to active hydrogen for forming an amino group of a melamine molecule are organic compounds containing at least one group selected from an isocyanate group, a glycidyl group, a carboxyl group, a methylol group and an aldehyde group.

10. The flame-retardant thermoplastic polymer compositions as described in the above item 8 or 9, wherein the melamine-coated ammonium polyphosphate is melamine-coated ammonium polyphosphate obtained by coating an ammonium polyphosphate powder with melamine in an amount of 0.5 to 20% by weight.

11. The flame-retardant thermoplastic polymer compositions as described in any one of the above items 8 to 10, wherein the nitrogen-containing organic compounds are homopolymers having one monomer represented by the following formula |II| as a constituent unit and/or copolymers of two or more kinds of said monomers;

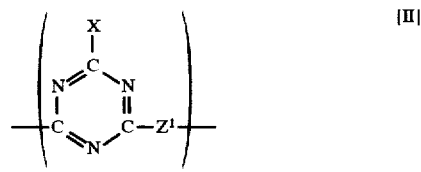

wherein each of X and $Z^1$ has a structure bonded to a triazine ring through a nitrogen atom; X is an alkylamino group represented by —$NHR^1$ or —$NR^2R^3$, said $R^1$, $R^2$ and $R^3$ each being a linear or branched alkyl group having 1 to 6 carbon atoms ($R^2$ and $R^3$ may be different from each other), a morpholino group, a piperidino group or a hydroxyalkylamino group represented by at least one of —$NHR^4$ and —$NR^5R^6$ ($R^5$ and $R^6$ may be different from each other); and $Z^1$ is a piperazinylene group, a group represented by —NH$(CH_2)_m$NH— (m is a number of 2 to 6) or a group represented by —$NR^7(CH_2)_nR^8N$— ($R^7$ and $R^8$ may be different from each other and n is a number of 2 to 6) and $R^4$, $R^5$, $R^6$, $R^7$ and $R^8$ are as defined above.

12. The flame-retardant thermoplastic polymer compositions as described in any one of the above items 8 to 11, wherein the nitrogen-containing organic compounds (B) are products obtained by the reaction of cyanuric chloride with diamines.

13. The flame-retardant thermoplastic polymer compositions as described in any one of the above items 8 to 12, wherein the thermoplastic polymers (D) are aliphatic thermoplastic resins, aromatic thermoplastic resins, aliphatic elastomers, aromatic elastomers, mixtures of two or more kinds of said elastomers, or thermoplastic elastomers known as mixtures of thermoplastic resins and elastomers or partial-crosslinked elastomers.

14. The flame-retardant thermoplastic polymer compositions as described in any one of the above items 8 to 13, wherein the thermoplastic polymers (D) are thermoplastic resins or mixtures of two or more kinds of thermoplastic resins selected from the following homopolymers and copolymers:
(1) α-olefin homopolymer resins or α-olefin copolymer resins,
(2) polymer resins of vinyl monomers or their derivatives,
(3) one kind of a resin or mixtures of two or more kinds of resins selected from nylons (polyamide resins),
(4) one kind of a thermoplastic resin or mixtures of two or more kinds of thermoplastic resins selected from homopolymer resins of aromatic compounds or copolymer resins of aromatic compounds,
(5) one kind of a thermoplastic elastomer or compositions of two or more kinds of thermoplastic elastomers, and
(6) one kind of an elastomer or mixtures of two or more kinds of elastomers selected from addition polymer-

7 ization type elastomers or condensation polymerization type elastomers.

15. The flame-retardant thermoplastic polymer compositions as described in any one of the above items 8 to 14, wherein the thermoplastic polymer is at least one polymer selected from the following polymers:

ethylene resins, propylene resins, 1-butene resins and 4-methyl-1-pentene resins, which belong to the group (1);

styrene resins, styrene-α-methylstyrene resins, poly (meth)acrylic acid resins, poly(meth)acrylic acid derivative resins, polyvinyl chloride resins, polyvinylidene chloride resins and acrylonitrile-butadiene-styrene type monomer copolymer resins, which belong to the group (2);

6-nylons, 7-nylons, 6,6-nylons, 6,7-nylons, 6,10-nylons, 6,12-nylons, 6-/-6,6-copolycondensation nylons and m-xylylene-adipic acid type nylons, which belong to the group (3);

polycarbonate resins, polyethylene terephthalate resins, polybutylene terephthalate resins, polysulfone resins, polyurethane resins and polyphenylene ether resins, which belong to the group (4);

mixtures of ethylene-propylene copolymer elastomers and ethylene resins, mixtures of ethylene-propylene copolymer elastomers and propylene resins, mixtures of ethylene-propylene copolymer elastomers and ethylene resins wherein the elastomer component is a partial-crosslinked product, and mixtures of ethylene-propylene copolymer elastomers and propylene resins wherein the elastomer component is a partial-crosslinked product, which belong to the group (5); and ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers, which belong to the group (6).

16. A water-insoluble ammonium polyphosphate powder obtained by bonding melamine molecules present on surfaces of melamine-coated ammonium polyphosphate particles to a crosslinking agent having a functional group reactive to active hydrogen for forming the melamine molecules so as to crosslink the surface of the melamine-coated ammonium polyphosphate powder.

17. The water-insoluble ammonium polyphosphate powder as described in the above item 16, wherein the mean particle diameter of the water-insoluble ammonium polyphosphate powder is not more than 50 μm.

18. A process for preparing a water-insoluble ammonium polyphosphate powder, comprising the steps of coating a surface of melamine-coated ammonium polyphosphate powder with a crosslinking agent having a functional group reactive to an active hydrogen for forming an amino group of a melamine molecule by means of attachment or impregnation and allowing the melamine molecule to react with the crosslinking agent.

19. The process for preparing a water-insoluble ammonium polyphosphate powder as described in the above item 18, wherein a crosslinking agent having at least one group selected from the group consisting of an isocyanate group, an oxymethyl group, a formyl group and an epoxy group as the functional group reactive to

8 an active hydrogen for forming an amino group of the melamine molecule is used.

Preferred Embodiments of the Invention

Oxygen-containing solid compound (A):

The oxygen-containing solid compound (A) (component (A)) containing an element belonging to Group II, Group III or Group IV of the periodic, which constitutes the flame-retardant composition of the invention, is a compound which improves the flame retardance when added in a small amount to a composition comprising a thermoplastic polymer (component (D), serving as a substrate), an ammonium polyphosphate powder, a melamine-coated ammonium polyphosphate powder or a water-insoluble ammonium polyphosphate powder (component (C)) and a nitrogen-containing organic compound (component (B)).

The above-mentioned element is at least one element selected from Ca, Ba, Sr, Mg, Al, Si, Zn, Cd, Ti, Zr and Sn. The oxygen-containing solid compound is at least one compound selected from hydroxides, basic carbonates, carbonates, carbonate hydrates, silicates, silicate hydrates, oxides and oxide hydrates of the above elements, and complexes of two or more kinds thereof. Particular examples of such compounds include calcium hydroxide, barium hydroxide, magnesium hydroxide, basic magnesium carbonate, basic zinc carbonate, calcium silicate hydrate, magnesium oxide hydrate, aluminum hydroxide, aluminum oxide hydrate, titanium oxide hydrate, hydrotalcite ($Mg_6Al_2(OH)_{16}CO_3.4H_2O$), kaolinite ($Al_2O_3.2SiO_2.2H_2O$), sericite ($K_2O.3Al_2O_3.6SiO_2.2H_2O$), pirophylite ($Al_2O_3.4SiO_2.H_2O$), bentonite ($Al_2O_3.4SiO_2.2H_2O$) and talc ($3MgO.4SiO_2.H_2O$).

The oxygen-containing solid compound (component (A)) for forming the flame-retardant composition of the invention is particulate, and the mean particle diameter thereof is preferably not less than 10 μm. The amount of the component (A) to be added is in the range of usually 0.1 to 5% by weight, preferably 0.5 to 2% by weight, based on the amount of the resulting composition. When the amount thereof is not more than 0.05% by weight, the flame retardance is not sufficiently improved. When the amount thereof is not less than 7% by weight, the flame retardance imparting effect is markedly reduced.

Nitrogen-containing organic compound (B) and preparation of the same:

The nitrogen-containing organic compound (B) (component (B)) for forming the flame-retardant composition of the invention is an organic compound which is thermally decomposed by ignition or contact with flame to generate nonflammable gas (water, carbon dioxide, ammonia, nitrogen, etc.) and carbonaceous residue when it is present together with the ammonium polyphosphate powder, the melamine-coated ammonium polyphosphate powder or the water-insoluble ammonium polyphosphate powder (component (C)) in the thermoplastic polymer (component (D)). The component (B) is a homopolymer and/or a copolymer, each comprising constituent units represented by the aforesaid formula [II]. The constituent units are exemplified by the following compounds [1] and [2]:

[1] 2-piperazinylene-4-morpholino-1,3,5-triazine, 2-piperazinylene-4-piperidino-1,3,5-triazine, 2-piperazinylene-4,N,N-bis(2-hydroxylethyl)amino-1, 3,5-triazine, 2-piperazinylene-4-N-(2-hydroxyethyl) amino-1,3,5-triazine: and

[2] products obtained by the reaction of cyanuric chloride with diamines.

Examples of the above products [2] include:

(i) products obtained by the reaction of cyanuric chloride with diamines preferably in a molar ratio of 2/3 (cyanuric chloride/diamine), (ii) products obtained by the reaction of cyanuric chloride with ethylenediamine in a molar ratio of 2/3 (cyanuric chloride/ethylenediamine), and (iii) products obtained by the reaction of cyanuric chloride with 1,3-diaminopropane in a molar ratio of 2/3 (cyanuric chloride/1,3-diaminopropane).

Conventionally known nitrogen-containing organic compounds may be employed in combination with the above-mentioned nitrogen-containing organic compound (B). For example, there can be employed a reaction product of aldehyde with a heterocyclic nitrogen compound containing at least one group of >C=O, >C=S and >NH inserted in the cyclic structure, a reaction product of benzylguanamine with aldehyde, and isocyanuric acid derivatives such as tris(2-hydroxyethyl)isocyanurate, tris(3-hydroxy-N-propyl) isocyanurate and tris(2,3-epoxypropyl)isocyanurate.

Homopolymerization of triazine type monomer:

A homopolymer having 2-piperazinylene-4-morpholino-1,3,5-triazine (i.e., the aforesaid formula |II|) as its constituent unit, that is an example of the nitrogen-containing organic compound (B), can be obtained by, for example, the following process.

2,6-Dihalo-4-morpholino-1,3,5-triazine (e.g., 2,6-dichloro-4-morpholino-1,3,5-triazine or 2,6-dibromo-4-morpholino-1,3,5-triazine) and piperazine are reacted with each other in an equimolar ratio with heating in an inert solvent such as xylene in the presence of an organic or inorganic base (e.g., triethylamine, tributylamine, sodium hydroxide, potassium hydroxide or sodium carbonate). After the reaction is completed, the reaction product is filtered to collect a solid. The solid is washed with boiling water to remove a salt (by-product) and dried.

The resulting homopolymer having 2-piperazinylene-4-morpholino-1,3,5-triazine as its constituent unit is insoluble in ordinary organic solvents, and the melting point thereof is unmeasurable. This homopolymer has a decomposition temperature of about 304° C. and a true density of 1.3 g/cc.

A homopolymer having 2-piperazinylene-4-bis(2-hydroxyethyl)amino-1,3,5-triazine as its constituent unit can be obtained in a manner similar to that described above using 2,6-dihalo-4-bis(2-hydroxyethyl)amino-1,3,5-triazine as a starting material.

A copolymer having 2-piperazinylene-4-morpholino-1,3,5-triazine and 2-piperazinylene-4-bis(2-hydroxyethyl)amino-1,3,5-triazine as its constituent units can be obtained in a manner similar to that described above using a mixture of 2,6-dihalo-4-morpholino-1,3,5-triazine and 2,6-dihalo-4-bis(2-hydroxyethyl)amino-1,3,5-triazine as a starting material. A mixing ratio between 2,6-dihalo-4-morpholino-1,3,5-triazine and 2,6-dihalo-4-bis(2-hydroxyethyl)amino-1,3,5-triazine can be arbitrarily selected to obtain a copolymer having an arbitrary monomer ratio.

For obtaining a reaction product of cyanuric chloride with ethylenediamine, cyanuric chloride and ethylenediamine are reacted with each other in a molar ratio of 2/3 (the former/the latter) in the presence of an organic or inorganic base (e.g., triethylamine, tributylamine, sodium hydroxide, potassium carbonate or sodium carbonate) using water as a solvent. The reaction is initiated at a temperature of not higher than 10° C. and carried out with slowly heating the system up to the reflux temperature of the solvent. After the reaction is completed, the reaction product is filtered to collect a solid. The solid is washed with boiling water to remove a salt (by-product), and the remaining solid is dried. The solid reaction product thus obtained is insoluble in organic solvents, and the solubility thereof in water at room temperature is not more than 0.1%. The decomposition temperature thereof is 324° C.

Amount of nitrogen-containing compound (B):

The amount of the component (B) to be added is in the range of usually 1 to 20% by weight, preferably 3 to 18% by weight, based on the weight of the resulting composition. When the amount thereof is not more than 0.5% by weight, the flame retardance is not sufficiently improved. On the other hand, even if the amount thereof is not less than 25% weight, further improvement in the flame retardance cannot be expected.

REFERENCE EXAMPLE 1

Ammonium polyphosphate powder (C1) and preparation of the same:

The powder of ammonium polyphosphate (C1) (component (C)) used in the invention is represented by the aforesaid formula |I|. The powder of melamine-coated ammonium polyphosphate (C2) is that obtained by coating the surface of the ammonium polyphosphate powder (C1) represented by the formula |I| with melamine molecules by means of chemical "addition" or physical "adsorption". The powder of water-insoluble ammonium polyphosphate (C3–C5) is that obtained by allowing active nitrogen which forms amine of melamine in the melamine coat of the melamine-coated ammonium polyphosphate (C2) to react with a crosslinking agent having a functional group reactive to the active nitrogen.

The term "addition" used herein means that the melamine molecule is linked to a proton of an oxygen-proton bond derived from ammonium polyphosphate (C1) by means of ions. The melamine molecule in this state is stable even when heated, and is hardly released again. The term "adsorption" means that the melamine molecule is physically adsorbed on the surface of the ammonium polyphosphate powder (C1). The melamine molecule in this state repeatedly undergoes sublimation from the surface of the ammonium polyphosphate powder (C1) and adsorption thereon repeatedly occurs when continuously heated, so as to be chemically linked to the proton of the oxygen-proton bond. The amount of the melamine molecules used herein is in the range of 0.5 to 20% by weight, preferably 2 to 10% by weight, based on the amount of the ammonium polyphosphate (C1). All the melamine molecules used are added or adsorbed on the surface of the ammonium polyphosphate powder (C1) to obtain a powder of melamine-coated ammonium polyphosphate (C2).

First step

Into a heating-kneading device such as a preheated kneader, a powder of ammonium polyphosphate (C1) represented by the aforesaid formula [I] is introduced in a given amount and heated for 0.5 to 5 hours at such a temperature that the ammonium polyphosphate powder is not melted and ammonia is easily eliminated from the ammonium polyphosphate, i.e., not higher than 300° C., preferably 200° to 300° C. As a result, ammonia, which is present inherently in a stoichiometric quantity in the ammonium polyphosphate (C2), is eliminated in part (about 5 to 10% by weight based on the stoichiometric quantity of ammonia).

Through the above process, there is produced ammonium polyphosphate lacking of a part ammonia or ammonium polyphosphate in which ammonia is bonded in the quantity of not more than the stoichiometric quantity in the process for preparing conventional ammonium polyphosphate (both sometimes referred to as "ammonia-short ammonium polyphosphate" hereinafter) in the form of a suspension (concentration: 1% by weight, pH: 4.0 to 6.0) or a powder.

Second step:

In the same device as described above, the "ammonia-short ammonium polyphosphate" powder is heated at a temperature of 250° to 300° C. (i.e., temperature at which the ammonium polyphosphate is not melted and the melamine molecules used for coating can be sublimated), and the melamine molecules are added thereto. As a result, ammonia is eliminated from the surface of the "ammonia-short ammonium polyphosphate" powder to alter the ammonium polyphosphate to polyphosphoric acid, and the melamine molecules are bonded to the oxygen-proton bond of the polyphosphoric acid.

As the ammonium polyphosphate, that is a starting material of the component (C) used in the invention, i.e., the ammonium polyphosphate powder (C1), the melamine-coated ammonium polyphosphate powder (C2) or the water-insoluble ammonium polyphosphate, commercially available ones can be employed. Examples of the commercially available ones include SUMISAEE-P (trade name, available from Sumitomo Chemical Co., Ltd.), EXOLIT-422 (trade name, available from Hoechst Co.), EXOLIT-700 (trade name, available from Hoechst Co.) and PHOSCHECK P/40 (trade name, available from Monsanto Co.). Also employable is a powder of ammonium polyphosphate (crystal form II) (C6) described in Japanese Patent Laid-Open Publication No. 300204/1992. The powder of ammonium polyphosphate (crystal form II) (C6) can be obtained, for example, by the process described later.

Amount of ammonium polyphosphate powder (C):

The amount of the ammonium polyphosphate powder (C1 or C6) or the melamine-coated ammonium polyphosphate powder (C2) to be added to the thermoplastic polymers (D) is usually in the range of 10 to 40% by weight, preferably 15 to 26% by weight, based on the amount of the resulting composition. When the amount thereof is not more than 7% by weight, particularly not more than 5% by weight, the flame retardance is not sufficiently improved. On the other hand, even if the amount thereof is not less than 50% weight, particularly not less than 45% by weight, further improvement in the flame retardance cannot be expected. The same can be said with the water-insoluble ammonium polyphosphate (C3–C5).

REFERENCE EXAMPLE 2

Preparation of ammonium polyphosphate (crystal form II) (C6)

The ammonium polyphosphate (crystal form (II)) (C6) used is prepared in the following manner.

A mixture of 660 g (5 mol) of diammonium hydrogen phosphate and 710 g (5 mol) of phosphorus pentoxide was introduced into a 5-liter bench kneader preheated to 290° to 300° C. in a nitrogen atmosphere and was stirred for 20 minutes with heating of the kneader. Then, to the mixture was added 195 g of an urea solution (concentration: 76.9%) of 80° C. by means of spraying. Subsequently, the resulting mixture was heated at 250° to 270° C. for 2.5 hours in an ammonia atmosphere to obtain 1,460 g of an ammonium polyphosphate powder.

This ammonium polyphosphate powder was a mixture of individual particles and agglomerates thereof. In order to process the agglomerates into individual particles, the agglomerates were pulverized in an ammonia atmosphere using a pulverizer [trade name: HOSOKAWAMICRON AP-B type, produced by Hosokawa Micron K.K.]. The X-ray diffraction pattern of the ammonium polyphosphate powder obtained was analyzed. As a result, it was confirmed that the type of the crystal thereof was type II, that is, the obtained product was ammonium polyphosphate (crystal form II) (C6), and the mean particle diameter thereof was 6.4 µm.

As the melamine molecules used for preparing the melamine-coated ammonium polyphosphate powder (C2), those commercially available as "melamine monomers" can be employed.

Preparation of water-insoluble ammonium polyphosphate (C3–C5):

The powder of water-insoluble ammonium polyphosphate (C3–C5), that is a main flame retardant used for preparing the secondary flame-retardant composition to attain the second object of the invention, is an ammonium polyphosphate powder having been surface crosslinked in the following manner.

The melamine molecules are added and/or adsorbed on the surface of the powder of ammonium polyphosphate (C1 or C6) by sublimation of the melamine molecules, to initially prepare a powder of melamine-coated ammonium polyphosphate (C2). Then, the melamine molecules present on the surface coat of each particle of the powder (C2) are allowed to react with a specific compound so as to form a crosslinked structure on the surface of the powder (C2), whereby the powder is modified to water-insoluble. This crosslinking reaction is a reaction of an active hydrogen which forms an amino group of the melamine molecule with a functional group which is contained in the specific compound and reactive to the active hydrogen.

Into a reactor equipped with a heating-stirring means or a heating-kneading means, the melamine-coated ammonium polyphosphate and a compound having a functional group reactive to an active hydrogen which forms an amino group of the melamine molecule, e.g., a formaldehyde aqueous solution, are introduced, and they are mixed. Then, the reactor is heated to a temperature at which a crosslinked structure can be easily formed among the active hydrogens which form amino groups of the melamine molecules, usually 80° to 200° C., preferably 100° to 150° C., for 0.5 to 2 hours, thereby to obtain a water-insoluble ammonium polyphosphate powder of the invention in which a crosslinked structure is formed in the melamine coat of the melamine-coated ammonium polyphosphate.

In the crosslinking reaction mentioned above, a single crosslinking agent is used. Therefore, the crosslinking reaction between the active hydrogen forming the amino group of the melamine molecule and the crosslinking agent on the same particle of the melamine-coated ammonium polyphosphate is carried out carefully, so that minimal crosslinking among the different particles by the cross linking agent takes place. Accordingly, the reaction proceeds in any of a solvent system and a non-solvent system. As the solvent system, any of a single solvent system and a mixed solvent system, i.e., water and/or organic solvents, can be employed.

The crosslinking agent used is a compound having one or more functional groups reactive with active hydrogen which forms an amino group of the melamine molecule, and the amount of the crosslinking agent is 0.5 to 6 mol equivalent times, preferably 1 to 2 mol equivalent times, in terms of the functional group contained therein, based on the melamine molecules contained in the melamine-coated ammonium polyphosphate. If the amount thereof is smaller than 0.5 mol equivalent times, a crosslinked structure is not sufficiently formed in the melamine coat, and therefore improvement in hydrolytic stability cannot be expected. On the other hand, if the amount thereof is larger than 6 mol equivalent times, there arises the unfavorable result of residual unreacted crosslinking agent.

Examples of the functional groups reactive with the active hydrogen which forms the amino group of the melamine molecule include an isocyanate group, an oxymethyl group, a formyl group and an epoxy group. Examples of the compounds having one or more isocyanate groups include 1,6-diisocyanatehexane, 1,1-dimethylenebis(4-isocyanatebenzene), 3,3'-dimethyldiphenyl-4,4'-diisocyanate and 1,5-diisocyanonaphthalate. Examples of the compounds having one or more methylol groups include methylolurea, methylol melamine, trimethylolethane and trimethylolpropane. Examples of the compounds having one or more aldehyde groups include formaldehyde, malonic aldehyde and glyoxal. Examples of the compounds having one or more epoxy groups include ethylene glycol diglycidyl ether, glycerol polyglycidyl ether and various epoxy resins such as bisphenol A type epoxy resins, phenolic novolak type epoxy resins and alicyclic epoxy resins. These compounds are all commercially available.

Thermoplastic polymers (D):

The thermoplastic polymer (D) (component (D)), which serves as a substrate of the flame-retardant composition of the invention, is at least one polymer selected from high-crystalline polymers, low-crystalline polymers, amorphous polymers and partial-crosslinked polymers. In other words, the thermoplastic polymer (D) used in the invention includes all substances capable of being molded by ordinary resin molding methods, and the meaning of the term "thermoplastic polymer" is not limited to "resins" but may include wax-like substances, elastomer-like substances and thermoplastic elastomers having both resin properties and the elastomeric properties.

Accordingly, substances whose melting points (Tm) are unmeasurable but whose softening points (Sp) are measurable and substances having indefinite melting points, such as a glass-like polymer called a "solid solution", are all included in the thermoplastic polymer (D) used as a substrate of the invention.

Listed below are preferred examples of the thermoplastic polymers (D) employable in the invention.

(1) 1-Olefin (α-olefin) resins:

one kind of a resin and mixtures (resin blends) of two or more kinds of resins selected from polyethylene resins, polypropylene resins, poly-1-butene resins, poly-4-methyl-1-pentene resins, poly-1-hexene resins, poly-1-octene resins and poly-1-decene resins Of the above polyolefin resins, preferred are crystalline polypropylene resins, particularly, a propylene homopolymer crystalline resin and copolymer crystalline resins of propylene and ethylene or propylene and at least one 1-olefin having 4 or more carbon atoms. Examples of the 1-olefins having 4 or more carbon atoms include 1-pentene, 1-hexene, 4-methyl-1-pentene, 1-heptene, 1-octene and 1-decene. Of the above resins, most useful are propylene-ethylene copolymer crystalline resins and propylene-1-butene copolymer crystalline resins.

Also preferred are ethylene polymers. Examples of the ethylene polymers include a crystalline ethylene homopolymer and crystalline copolymers of ethylene and 1-olefins having 3 or more carbon atoms.

(2) Styrene resins:

polystyrene resins (PS), high-impact polystyrene resins (HIPS), heat-resistant polystyrene resins (including styrene-α-methylstyrene copolymer resin), acrylonitrile-styrene copolymer resins (AS) and acrylonitrile-butadiene-styrene copolymer resins (ABS)

Also employable are the following crystalline or amorphous thermoplastic resins.

(3) Vinyl resins:

polyvinyl chloride resin (PVC), polyvinylidene chloride resin (PVDC), polymethyl acrylate resin (PMA) and polymethyl methacrylate resin (PMMA)

(4) One kind of a nylon (polyamide resin) or mixtures of two or more kinds of nylons:

6-nylon, 7-nylon, 11-nylon, 12-nylon, 6,6-nylon, 6,10-nylon, 6,12-nylon, and all aromatic nylons, e.g., condensate of terephthalic acid unit and p-phenylenediamine unit, m-xylylene-adipic acid condensation nylons (MXD6), 6-/6,6-copolycondensation nylon and 6-/12-copolycondensation nylon (5) Thermoplastic polyester resins:

polyethylene terephthalate, polybutylene terephthalate, and all aromatic polyesters, e.g., polyphenylene terephthalate, (linking a hydroquinone unit and terephthalic acid unit).

(6) One kind of a thermoplastic resin or mixtures of two or more kinds of thermoplastic resins selected from homopolymer resins of aromatic compounds and copolymer (including cocondensate) resins of aromatic compounds:

polycarbonate resins (PC), polysulfone resins, polyphenylene ether resins (PPE), acrylonitrile-styrene-1,3-butadiene copolymer resins (ABS) and polyurethane resins (PU)

Elastomers:

The thermoplastic polymers (D) for forming the flame-retardant thermoplastic polymer composition of the invention further include resin blends containing small amounts of elastomers, and "thermoplastic elastomers". The thermoplastic elastomers include not only simple blends (compositions) composed of resins and elastomers but also other compositions in which elastomers are contained in the partial-crosslinked form. For obtaining these compositions, the resin components and the elastomer components must be kneaded at a temperature not lower than the highest softening point of those components. Examples of the elastomers are described below.

(7) One kind of an elastomer or mixtures of two or more kinds of elastomers selected from the following addition polymerization type elastomers and condensation polymerization type elastomers:

(i) One kind of an elastomer or mixtures of two or more kinds of elastomers selected from α-olefin copolymer elastomers ethylene-propylene copolymer elastomers (EPM) and ethylene-propylene-nonconjugated diene copolymer elastomers (EPDM), particularly, ethylene-propylene-2-ethylidene-5-norbornene copolymer elastomers (EPDM) and propylene-1-butene copolymer elastomers (PBM)

(ii) One kind of a rubber or mixtures of two or more kinds of rubbers selected from homopolymer rubbers of nonconjugated dienes and copolymer rubbers of nonconjugated dienes poly-1,3-butadiene rubber (BR), polyisoprene rubber (IR), acrylonitrile-1,3-butadiene copolymer rubber (NBR), chloroprene rubbers, isobutene-isoprene rubbers (IIR, commonly called "butyl rubber") and natural rubbers (NR)

The above-mentioned various elastomers are conceptually classified into the following groups.

Polyolefin elastomers (D3), e.g., an ethylene-propylene copolymer elastomer (EPM), an ethylene-propylenenonconjugated diene copolymer elastomer (EPDM), a partial-crosslinked product of a composition composed of an ethylene crystalline polymer and an ethylene-propylene-nonconjugated diene copolymer elastomer, and a partial-crosslinked product of a composition composed of a propylene crystalline polymer and an ethylene-propylene-nonconjugated diene copolymer elastomer (8) Elastomers obtained by condensation polymerization: polyurethane elastomers Other additives:

The flame-retardant thermoplastic polymer composition of the invention may contain various additives which are generally added to thermoplastic polymers, for example, antioxidant (particularly, steric hindrance phenol type stabilizer), heat stabilizer, ultraviolet inhibitor, antistatic agent, copper harm inhibitor, lubricant, neutralizing agent, nucleating agent and pigment. Examples of the neutralizing agents include metallic salts of higher fatty acids and complex salts of metallic oxides or metallic hydroxides, such as hydrotalcite, manaseite, talc, mica and white carbon.

Other than the above additives, high-viscosity silicone oil, silicone resins and polyhydric alcohols may be also added. Instead of the polyhydric alcohols, IIA Group metal salts of higher aliphatic carboxylic acids (E3), such as magnesium stearate and calcium stearate, may be used.

The high-viscosity silicone oil is dialkylpolysiloxane which is substantially linear. Useful examples thereof are polymers of dimethylsiloxane having a viscosity of about 90,000 to 150,000 cps at 25 °C. The silicone resins are MQ silicone resins generally formed from monofunctional "M units" having an average composition formula $(R^9)_3SiO_{0.5}$ (wherein $R^9$ is a saturated or an unsaturated hydrocarbon group such as alkyl, aryl, vinyl or allyl group) and four-functional "Q units" having an average composition formula $SiO_2$, and having a ratio of the "M units" to the "Q units" (M/Q) of 0.3 to 0.4.

Examples of the polyhydric alcohols include pentaerythritols such as pentaerythritol, dipentaerythritol and tripentaerythritol.

The high-viscosity silicone oil, silicone resins and polyhydric alcohols which may be added to the composition of the invention as additives (E) are not limited to those of special qualities, and satisfactory effects can be exerted by the use of commercially available ones.

Preparation of the polymer composition of the primary flame retardance formulation according to the invention:

The thermoplastic polymer composition of the primary flame retardance formulation according to the invention can be prepared by, for example, the following process. The thermoplastic polymer (D) (serving as a substrate), the oxygen-containing solid compound (A), the ammonium polyphosphate (C1 or C6) or the melamine-coated ammonium polyphosphate (C2), the nitrogen-containing organic compound (B), and if necessary, other additives (E) are introduced in given amounts into an appropriate mixing apparatus such as Henschel mixer (trade name), super mixer or tumbling mixer, and they are stirred and mixed for 1 to 10 minutes. The resulting mixture is melt kneaded at a temperature of 170° to 220° C. and extruded into strands by means of a roll mill or a screw extruder (or a vented extruder, if necessary). The strands are then cut and pelletized to obtain the aimed flame-retardant composition.

EXAMPLES

The present invention will be further described with reference to the following examples, but it should be construed that the invention is in no way limited to those examples.

In the following examples, flame retardance and other properties were evaluated in the manner described below.

(1) Flame retardance: UL94V

The flame retardance was evaluated in accordance with the vertical burning test defined in "Burning Test of Plastic Materials for Machine Parts" of UL Subject 94 (Underwriter Laboratories Inc.).

thickness of specimen (primary flame retardance formulation): 1.2 mm (1/21 inch), thickness of specimen (secondary flame retardance formulation): 1.6 mm (1/16 inch)

(2) Flame retardance: oxygen index (O.I.)

The flame retardance was also evaluated by measuring the oxygen index in accordance with JIS (Japanese Industrial Standard) K7201 (burning test of polymer materials by the oxygen index method).

(3) Evaluation of hydrolytic stability

A water-soluble component contained in the product was quantitatively determined. For the quantitative determination of the water-soluble component, 1 g of the ammonium polyphosphate powder obtained was suspended in 99 g of pure water to prepare three samples of 1 wt. % suspension. These samples were stirred for 1 hour at 25° C., 50° C. and 75° C., respectively, and then subjected to centrifugal separation. The supernatant liquid was filtered through a filter paper (thickness: 0.45 μm). A given amount of the filtrate was placed in a laboratory dish and evaporated to dryness in a dryer. From the amount of the residue, the amount of the water-soluble component was calculated to evaluate the hydrolytic stability. The smaller the value of the amount of the water-soluble component is, the higher the hydrolytic stability is.

(4) Measurement of mean particle diameter

A powder to be measured was dispersed in an ethyl alcohol dispersing medium, and the mean particle diameter of the powder was measured using a laser diffraction/scattering type particle size distribution measuring device (trade name: LA-700, produced by Horiba Seisakusho K.K.).

(5) Measurement of mechanical strength

Into Cooking Mixer (trade name) were introduced 70% by weight of a propylene-ethylene crystalline copolymer [ethylene content: 8.0% by weight, MFR (230° C., 2.16 kgf): 20 g/10 min] as a polypropylene resin (D), 20% by weight of water-insoluble ammonium polyphosphate (C) obtained in each example, 10% by weight of a 2-piperazinylene-4-morpholino-1,3,5-triazine polymer (B), and 0.15% by weight of 2,6-di-t-butyl-p-cresol (E1), 0.2% by weight of dimyristyl thiodipropionate (E2) and 0.1% by weight of calcium stearate (E3), each as an additive (E), and they were mixed for 1 hour.

The resulting mixture was kneaded and extruded using CSI-Max Mixing Extruder (Model CS-194A, trade name) to prepare pellets. The pellets of the flame-retardant resin composition obtained were molded into a predetermined specimen by a hot press molding machine (having the highest temperature of 210° C.). The specimen was subjected to the following Izod impact test and drop-weight impact test in accordance with a Dupont method.

(i) Izod impact test

The Izod impact test was carried out in accordance with JIS K7110.

(ii) Dupont method drop-weight impact test

Using a specimen (50 mm×50 mm×2 mm), the Dupont impact strength was measured by a drop-weight impact testing equipment (defined by JIS K5400-8, 3, 2) under the conditions of a specimen temperature of 10° C., an impact point curvature radius of ¼ inch and an impact point receiver inner diameter of ½ inch, with varying the impact point weight and the dropping height.

(6) Infrared spectrophotometry

The crosslinked structure on the surfaces of the water-insoluble ammonium polyphosphate particles was observed by a Fourier transform infrared spectrophotometer [trade name: FTIR-4000, produced by Shimazu Seisakusho K.K.] in accordance with a KBr tablet method.

Example 1

Into a Henschel mixer (trade name) were introduced 56.5% by weight of a crystalline propylene-ethylene block copolymer (D1) [ethylene content: 8.5% by weight, MFR (230° C., 2.16 kgf): 20 g/10 min], 10% by weight of high-density polyethylene (D2) [MI (190° C., 2.16 kgf): 6.5 g/10 min, melting point (Tm): 130° C., density: 0.952 g/cc] and 10% by weight of an ethylene-propylene rubber (D3) [trade name: EP-02P, available from Japan Synthetic Rubber Co., Ltd.], each as a thermoplastic polymer (D), 1.0% by weight of magnesium oxide (A1) [trade name: KYOWAMAG, available from Kyowa Kagaku K.K.] as an oxygen-containing solid compound (A), 5% by weight of a homopolymer (B1) having a constituent unit of 2-piperazinylene-4-morpholino-1,3,5-triazine as a nitrogen-containing organic compound (B), 17% by weight of a powder of ammonium polyphosphate (crystal form II) (C1) as a powder of ammonium polyphosphate (C), and 0.2% by weight of 2,6-di-t-butyl-p-cresol (E1), 0.2% by weight of dimyristyl-$\beta,\beta'$-thiodipropionate (E2) and 0.1% by weight of calcium stearate (E3), each as an additive (E), and they were stirred and mixed for 3 minutes. The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was measured on the oxygen index and the flame retardance to evaluate the primary flame retardance formulation. The results are set forth in Table 1.

Example 2

The procedure of Example 1 was repeated except that magnesium oxide (A2) [trade name: KYOWAMAG, available from Kyowa Kagaku K.K.) was used in an amount of 0.5% by weight based on the weight of the resulting composition as the oxygen-containing solid compound (A), to prepare pellets. Using the pellets, the oxygen index and the flame retardance were measured in the same manner as described in Example 1 to evaluate the primary flame retardance formulation. The results are set forth in Table 1.

Example 3

The procedure of Example 1 was repeated except that aluminum oxide (A2) [trade name: Alumina-A-42-3, available from Showa Denko K.K.] was used in an amount of 3.0% by weight based on the weight of the resulting composition as the oxygen-containing solid compound (A), to prepare pellets. Using the pellets, the oxygen index and the flame retardance were measured in the same manner as described in Example 1 to evaluate the primary flame retardance formulation. The results are set forth in Table 1.

Examples 4–9

The procedure of Example 1 was repeated except that the following compound was used as the oxygen-containing solid compound (A), to prepare pellets. Using the pellets, the oxygen index and the flame retardance were measured in the same manner as described in Example 1 to evaluate the primary flame retardance formulation. The results are set forth in Table 1.

Example 4: aluminum oxide (A2) [trade name: Alumina A-42-3, available from Showa Denko K.K.]

Example 5: magnesium hydroxide (A3) [trade name: KISMA 5A, available from Kyowa Kagaku K.K.]

Example 6: talc (A4)

Example 7: calcium metasilicate (A5)

Example 8: magnesium silicate (A6)

Example 9: basic magnesium carbonate (A7)

Example 10

The procedure of Example 1 was repeated except that a powder of melamine-coated ammonium polyphosphate (C2) was used as the powder of ammonium polyphosphate (C), to prepare pellets. Using the pellets, the oxygen index and the flame retardance were measured in the same manner as described in Example 1 to evaluate the primary flame retardance formulation. The results are set forth in Table 2.

Example 11

The procedure of Example 4 was repeated except that a powder of melamine-coated ammonium polyphosphate (C2) was used as the powder of ammonium polyphosphate (C), to prepare pellets. Using the pellets, the oxygen index and the flame retardance were measured in the same manner as described in Example 4 to evaluate the primary flame retardance formulation. The results are set forth in Table 2.

Example 12

The procedure of Example 1 was repeated except that a product (B2) obtained by reacting cyanuric chloride with ethylenediamine in the reaction molar ratio of 2/3 (cyanuric chloride/ethylenediamine) was used as the nitrogen-containing organic compound (B), to prepare pellets. Using the pellets, the oxygen index and the flame retardance were measured in the same manner as described in Example 1 to evaluate the primary flame retardance formulation. The results are set forth in Table 2.

Example 13

Into a Henschel mixer (trade name) were introduced 65.5% by weight of low-density polyethylene (D4) [MI (190° C., 2.16 kgf): 3 g/10 min, softening point: 96° C., density: 0.942 g/cc, trade name: PETROCEN 186, available from TOSOH CORPORATION] as a thermoplastic polymer (D), 1.0% by weight of magnesium hydroxide (A3) [trade name: KISMA 5A, available from Kyowa Kagaku K.K.] as an oxygen-containing solid compound (A), 9% by weight of a homopolymer (B1) having a constituent unit of 2-piperazinylene-4-morpholino-1,3,5-triazine as a nitrogen-containing organic compound (B), 24% by weight of a powder of ammonium polyphosphate (crystal form II) (C6) as a powder of ammonium polyphosphate (C), and 0.2% by weight of 2,6-di-t-butyl-p-cresol (E1), 0.2% by weight of dimyristyl-$\beta,\beta'$-thiodipropionate (E2) and 0.1% by weight of calcium stearate (E3), each as an additive (E), and they were stirred and mixed for 3 minutes. The resulting mixture was melt kneaded at a temperature of 200° C. and extruded by an extruder (bore diameter: 30 mm), to obtain pellets of a flame-retardant polymer composition. The pellets were

19 molded into a predetermined specimen. The specimen was measured on the oxygen index and the flame retardance to evaluate the primary flame retardance formulation. The results are set forth in Table 2.

Example 14

Into a Henschel mixer (trade name) were introduced 62.5% by weight of a polystyrene resin (D5) [MI (190° C., 2.16 kgf): 1.7 g/10 min, softening point: 97° C., density: 1.05 g/cc, trade name: STYRON 475S, available from Asahi Chemical Industry Co., Ltd.] as a thermoplastic polymer (D), 1.0% by weight of magnesium hydroxide (A3) [trade name: KISMA 5A, available from Kyowa Kagaku K.K.] as an oxygen-containing solid compound (A), 10% by weight of a homopolymer (B1) having a constituent unit of 2-piperazinylene-4-morpholino-1,3,5-triazine as a nitrogen-containing organic compound (B), 26% by weight of a powder of ammonium polyphosphate (crystal form II) (C6) as a powder of ammonium polyphosphate (C), and 0.2% by weight of 2,6-di-t-butyl-p-cresol (E1), 0.2% by weight of dimyristyl-β,β'-thiodipropionate (E2) and 0.1% by weight of calcium stearate (E3), each as an additive (E), and they were stirred and mixed for 3 minutes. The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was measured on the oxygen index and the flame retardance to evaluate the primary flame retardance formulation. The results are set forth in Table 2.

Comparative Example 1

Into a Henschel mixer (trade name) were introduced 57.5% by weight of a crystalline propylene-ethylene block copolymer (D1) [ethylene content: 8.5% by weight, MFR (230° C., 2.16 kgf): 20 g/10 min], 10% by weight of high-density polyethylene (D2) [MI (190° C., 2.16 kgf): 6.5 g/10 min, melting point (Tm): 130° C., density: 0.952 g/cc] and 10% by weight of an ethylene-propylene rubber (D3) [trade name: EP-02P, available from Japan Synthetic Rubber Co., Ltd.), each as a thermoplastic polymer (D), 5% by weight of a homopolymer (B1) having a constituent unit of 2-piperazinylene-4-morpholino-1,3,5-triazine as a nitrogen-containing organic compound (B), 17% by weight of a powder of ammonium polyphosphate (crystal form II) (C6) as a powder of ammonium polyphosphate (C), 1.0% by weight of magnesium sulfate (A8) (solid acid) in place of the oxygen-containing solid compound (A) used in the above examples, and 0.2% by weight of 2,6-di-t-butyl-p-cresol (E1), 0.2% by weight of dimyristyl-β,β'-thiodipropionate (E2) and 0.1% by weight of calcium stearate (E3), each as an additive (E), and they were stirred and mixed for 3 minutes.

The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was evaluated on the flame retardance. The result is set forth in Table 1.

Comparative Example 2

The procedure of Example 1 was repeated except that calcium sulfate (A9) (solid acid) was used in place of the oxygen-containing solid compound (A), to prepare pellets. Using the pellets, the flame retardance was evaluated. The result is set forth in Table 1.

20

Comparative Example 3

The procedure of Example 1 was repeated except that 50.5% by weight of a crystalline propylene-ethylene block copolymer (D1) [ethylene content: 8.5% by weight, MFR (230° C., 2.16 kgf): 20 g/10 min] was used as the thermoplastic polymer (D) and 7.0% by weight of magnesium hydroxide (A5) [trade name: KISMA 5A, available from Kyowa Kagaku K.K.] was used as the oxygen-containing solid compound (A), to prepare pellets. Using the pellets, the flame retardance was evaluated. The result is set forth in Table 1.

Comparative Example 4

Into a Henschel mixer (trade name) were introduced 66.5% by weight of low-density polyethylene (D4) [MI (190° C., 2.16 kgf): 3 g/10 min, softening point: 96° C., density: 0.924 g/cc, trade name: PETROCEN 186, available from TOSOH CORPORATION] as a thermoplastic polymer (D), 9% by weight of a homopolymer (B1) having a constituent unit of 2-piperazinylene-4-morpholino-1,3,5-triazine as a nitrogen-containing organic compound (B), 24% by weight of a powder of ammonium polyphosphate (crystal form II) (C6) as a powder of ammonium polyphosphate (C), and 0.2% by weight of 2,6-di-t-butyl-p-cresol (E1), 0.2% by weight of dimyristyl-β,β'-thiodipropionate (E2) and 0.1% by weight of calcium stearate (E3), each as an additive (E), and they were stirred and mixed for 3 minutes.

The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was evaluated on the flame retardance. The result is set forth in Table 2.

Comparative Example 5

Into a Henschel mixer (trade name) were introduced 63.5% by weight of a polystyrene resin (D5) [MI (190° C., 2.16 kgf): 1.7 g/10 min, softening point: 97° C., density: 1.05 g/cc, trade name: STYRON 475S, available from Asahi Chemical Industry Co., Ltd.] as a thermoplastic polymer (D), 10% by weight of a homopolymer (B1) having a constituent unit of 2-piperazinylene-4-morpholino-1,3,5-triazine as a nitrogen-containing organic compound (B), 26% by weight of a powder of ammonium polyphosphate (crystal form II) (C6) as a powder of ammonium polyphosphate (C), and 0.2% by weight of 2,6-di-t-butyl-p-cresol (E1), 0.2% by weight of dimyristyl-β,β'-thiodipropionate (E2) and 0.1 % by weight of calcium stearate (E3), each as an additive (E), and they were stirred and mixed for 3 minutes.

The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was evaluated on the flame retardance. The result is set forth in Table 2.

Preparation of the polymer composition of the secondary flame retardance formulation according to the invention:

Example 15

Into a 5-liter kneader (equipped with a heating-kneading means and a deaeration means) were introduced 1,000 g of a powder of melamine-coated ammonium polyphosphate (C2) and 203 g of a formaldehyde aqueous solution (concentration: 37%), and they were mixed at room temperature for 30 minutes. Then, the resulting mixture was heated to 100° C. to perform reaction for 1 hour with stirring, so as to obtain 1,035 g of a powder of water-insoluble ammonium polyphosphate (C3). This water-insoluble ammonium polyphosphate powder was prepared by crosslinking the melamine molecules present on the surface of the melamine-coated ammonium polyphosphate (C2) powder (starting material) with the aldehyde group (—CHO) so as to water-insolubilize the melamine-coated ammonium polyphosphate (C2) powder.

Into a Henschel mixer (trade name) were introduced 20% by weight of the water-insoluble ammonium polyphosphate (C3) powder, 10% by weight of a homopolymer (B1) having a constituent unit of 2-piperazinylene-4-morpholino-1,3,5-triazine as a nitrogen-containing organic compound (B), 60.5% by weight of a propylene-ethylene crystalline copolymer (D1) [ethylene content: 8.5% by weight, MFR (230° C., 2.16 kgf): 20 g/10 min] as a thermoplastic resin (D), and 0.2% by weight of 2,6-di-t-butyl-p-cresol (BHT) (E1), 0.2% by weight of dimyristyl-β,β'-thiodipropionate (DMyTDP) (E2) and 0.1% by weight of calcium stearate (CS) (E3), each as an additive (E), and they were stirred and mixed for 3 minutes.

The resulting mixture was melt kneaded at a temperature of 200° C. and extruded by an extruder (bore diameter: 30 mm), to obtain pellets of a flame-retardant polymer composition. The flame-retardant polymer composition pellets thus obtained were dried at 100° C. for 3 hours and molded into a predetermined specimen using an injection molding machine (highest temperature of cylinder: 220° C.). The specimen was measured with regard to surface electrical resistance before and after immersion in hot water, bleed resistance lasting period under conditions of high temperature and high humidity and flame retardance to evaluate the secondary flame retardance formulation. The results are set forth in table 3.

Examples 16–18

The procedure of Example 15 was repeated except that the following compound was used as the nitrogen-containing organic compound (B), to prepare pellets of a flame-retardant polymer composition. The pellets were molded into a predetermined specimen. The specimen was measured with the regard to surface electrical resistance before and after immersion in hot water, bleed resistance lasting period under conditions of high temperature and high humidity and flame retardance to evaluate the secondary flame retardance formulation. The results are set forth in table 3.

Example 16: a homopolymer (B2) having 2-piperazinylene-4-N,N-bis(2-hydroxyethyl)amino-1,3,5-triazine as its constituent unit Example 17: a copolymer (B3) of 2-piperazinylene-4-morpholino-1,3,5-triazine and 2-piperazinylene-4-N,N-bis (2-hydroxyethyl)amino-1,3,5-triazine in the equimolar ratio Example 18: a reaction product (B4) of cyanuric chloride (2 mol) with ethylenediamine (3 mol)

Example 19

Into a 5-liter glass flask (equipped with a heating-stirring means and a deaeration means) were introduced 1,000 g of a powder of melamine-coated ammonium polyphosphate (C2) and 900 g of toluene. To the flask were further introduced 132 g of hexamethylene diisocyanate and 2.6 g of NIKKAOCTHIK"SN" catalyst, and the content in the flask was mixed at room temperature. Then, the temperature in the glass flask was elevated to reflux temperature, and the content was mixed for 2 hours at the same temperature. After cooling and filtering, the content was transferred into a dryer and dried at 100° C. for 1 hour, to obtain 1,080 g of a powder of water-insoluble ammonium polyphosphate (C4). This water-insoluble ammonium polyphosphate powder was prepared by uniformly crosslinking the melamine molecules present on the surface of the melamine-coated ammonium polyphosphate (C2) powder (starting material) with the isocyanate group (—NCO).

Pellets of a flame-retardant polymer composition were prepared in the same manner as described in Example 1 except that the water-insoluble ammonium polyphosphate (C4) was used in an amount of 20% by weight. The pellets were molded into a specimen. The specimen was measured with regard to surface electrical resistance before and after immersion in hot water, bleed resistance lasting period under conditions of high temperature and high humidity and flame retardance to evaluate the secondary flame retardance formulation. The results are set forth in table 3.

Example 20

Into a 5-liter glass flask (equipped with a heating-stirring means and a deaeration means) were introduced 1,000 g of a powder of melamine-coated ammonium polyphosphate (C2), 909 g of water and 91 g of methanol. To the flask was further introduced 92 g of glyoxal (concentration: 49%), and the content in the flask was mixed at room temperature. Then, the temperature in the glass flask was elevated to reflux temperature, and the content was stirred for 2 hours. After cooling, the content was filtered and transferred into a dryer, followed by drying at 100° C. for 1 hour, to obtain 1,025 g of a powder of water-insoluble ammonium polyphosphate (C5).

This water-insoluble ammonium polyphosphate powder was prepared by uniformly crosslinking the melamine molecules present on the surface of the melamine-coated ammonium polyphosphate (C2) powder (starting material) with the aldehyde group.

Pellets of a flame-retardant polymer composition were prepared in the same manner as described in Example 1 except that the water-insoluble ammonium polyphosphate (C5) powder was used in an amount of 20% by weight. The pellets were molded into a specimen. The specimen was measured with regard to surface electrical resistance before and after immersion in hot water, bleed resistance lasting period under conditions of high temperature and high humidity and flame retardance to evaluate the secondary flame retardance formulation. The results are set forth in table 3.

Example 21

The procedure of Example 1 was repeated except for using 66.5% by weight of low-density polyethylene (D2) [trade name: PETROCEN 186, available from TOSOH CORPORATION] as a thermoplastic resin (D), 24% by weight of a powder of the water-insoluble ammonium polyphosphate (C3), 9% by weight of a homopolymer (B1) having a constituent unit of 2-piperazinylene-4-morpholino-1,3,5-triazine as a nitrogen-containing organic compound (B), and 0.2% by weight of 2,6-di-t-butyl-p-cresol (E1), 0.2% by weight of dimyristyl-β,β'-thiodipropionate (E2) and 0.1% by weight of calcium stearate (E3), each as an additive (E), to prepare pellets of a flame-retardant polymer composition. The pellets were molded into a specimen. The specimen was measured with regard to surface electrical resistance before and after immersion in hot water, bleed resistance lasting period under conditions of high temperature and high humidity and flame retardance to evaluate the secondary flame retardance formulation. The results are set forth in table 3.

Example 22

The procedure of Example 1 was repeated except for using 63.5% by weight of a polystyrene resin (D3) [trade name: STYRON 475S, available from Asahi chemical Industry Co., Ltd.] as a thermoplastic resin (D), 26% by weight of a powder of the water-insoluble ammonium polyphosphate (C3), 10% by weight of a homopolymer (B1) having a constituent unit of 2-piperazinylene-4-morpholino-1,3,5-triazine as a nitrogen-containing organic compound (B), and 0.2% by weight of 2,6-di-t-butyl-p-cresol (E1), 0.2% by weight of dimyristyl-$\beta,\beta'$-thiodipropionate (E2) and 0.1% by weight of calcium stearate (E3), each as an additive (E), to prepare pellets of a flame-retardant polymer composition. The pellets were molded into a specimen. The specimen was measured with regard to surface electrical resistance before and after immersion in hot water, bleed resistance lasting period under conditions of high temperature and high humidity and flame retardance to evaluate secondary flame retardance formulation. The results are set forth in table 3.

Comparative Example 6

The procedure of Example 1 was repeated except for using 20% by weight of a powder of ammonium polyphosphate (crystal form II) (C6) in place of the water-insoluble ammonium polyphosphate powder (C3), to prepare pellets of a flame-retardant polymer composition. The pellets were molded into a specimen. The specimen was measured with regard to surface electrical resistance before and after immersion in hot water, bleed resistance lasting period under conditions of high temperature and high humidity and flame retardance. The results are set forth in table 3.

Comparative Example 7

The procedure of Example 1 was repeated except for using 20% by weight of a powder of commercially available ammonium polyphosphate (C7) [trade name: SUMISAFE-P, available from Sumitomo Chemical Co., Ltd.] in place of the water-insoluble ammonium polyphosphate powder (C3), to prepare pellets of a flame-retardant polymer composition. The pellets were molded into a specimen. The specimen was measured with regard to surface electrical resistance before and after immersion in hot water, bleed resistance lasting period under conditions of high temperature and high humidity and the flame retardance. The results are set forth in table 3.

Comparative Example 8

Into a 5-liter glass flask (equipped with a heating-stirring means and a deaeration means) were introduced 900 g of a powder of ammonium polyphosphate (crystal form II) (C6) and a mixed solvent consisting of 600 g of water and 400 g of methanol, and they were stirred and mixed at room temperature. To the flask was further introduced a methylol melamine aqueous solution separately prepared (i.e., aqueous solution of a reaction product obtained by mixing and stirring 100 g of melamine and 160 g of a formaldehyde aqueous solution (concentration: 37%) at 70° C. for 1 hour) to adjust pH of the system to 4.5, and the reaction was performed at 75° C. for 2 hours to resinify the methylol melamine.

After cooling, the content in the flask was filtered and transferred into a dryer, followed by drying at 100° C. for 1 hour, to obtain 1,030 g of resin-attached ammonium polyphosphate (C8). This resin-attached ammonium polyphosphate was prepared by attaching the melamine resin onto the surface of the ammonium polyphosphate (crystal form II) powder (C6).

Pellets of a flame-retardant polymer composition were prepared in the same manner as described in Example 15 except that 20% by weight of the melamine resin-attached ammonium polyphosphate (C8) was used in place of the water-insoluble ammonium polyphosphate (C3). The pellets were molded into a specimen. The specimen was measured surface electrical resistance before and after immersion in hot water, bleed resistance lasting period under conditions of high temperature and high humidity and flame retardance. The results are set forth in table 3.

Example 23

Into a Henschel mixer (trade name) were introduced 56.5% by weight of a crystalline propylene-ethylene block copolymer (D1) [ethylene content: 8.5% by weight, MFR (230° C., 2.16 kgf): 20 g/10 min], 10% by weight of high-density polyethylene (D2) [MI (190° C., 2.16 kgf): 6.5 g/10 min, melting point (Tm) : 130° C., density: 0.952 g/cc] and 10% by weight of an ethylene-propylene rubber (D3) [trade name: EP-02P, available from Japan Synthetic Rubber Co., Ltd.], each as a thermoplastic polymer (D), 0.5% by weight of magnesium oxide (A1) [trade name: KYOWAMAG, available from Kyowa Kagaku K.K.] as an oxygen-containing solid compound (A), 5% by weight of a homopolymer (B1) having a constituent unit of 2-piperazinylene-4-morpholino-1,3,5-triazine as a nitrogen-containing organic compound (B), 17% by weight of a powder of water-insoluble ammonium polyphosphate (C3) having been crosslinked by the reaction with formaldehyde as a powder of ammonium polyphosphate (C), and 0.2% by weight of 2,6-di-t-butyl-p-cresol (E1), 0.2% by weight of dimyristyl-$\beta,\beta'$-thiodipropionate (E2) and 0.1% by weight of calcium stearate (E3), each as an additive (E), and they were stirred and mixed for 3 minutes. The resulting mixture was melt kneaded at a temperature of 200° C. and extruded by an extruder (bore diameter: 30 mm), to obtain pellets of a flame-retardant polymer composition. The pellets were molded into a predetermined specimen. The specimen was measured with regard to oxygen index and flame retardance to evaluate the primary flame retardance formulation. The results are set forth in Table 4.

Example 24

The procedure of Example 23 was repeated except for using 1.0% by weight of aluminum oxide as the oxygen-containing solid compound (A), to prepare pellets. Using the pellets, the oxygen index and the flame retardance were measured in the same manner as described in Example 1 to evaluate the primary flame retardance formulation. The results are set forth in Table 4.

Example 25

The procedure of Example 23 was repeated except for using 2.0% by weight of magnesium hydroxide (A1) as the oxygen-containing solid compound (A), 5% by weight of a product (B2) obtained by reacting cyanuric chloride with ethylenediamine in the reaction molar ratio of 2/3 (cyanuric chloride/ethylenediamine) as the nitrogen-containing organic compound (B) and 17% by weight of a powder of water-insoluble ammonium polyphosphate (C3) having been crosslinked by the reaction with formaldehyde as the powder of ammonium polyphosphate (C), to prepare pellets. Using the pellets, the oxygen index and the flame retardance were measured in the same manner as described in Example 1 to evaluate the primary flame retardance formulation. The results are set forth in Table 4.

Example 26

The procedure of Example 23 was repeated except for using 1.0% by weight of magnesium hydroxide (A1) as the oxygen-containing solid compound (A), 5% by weight of a product (B2) obtained by reacting cyanuric chloride with ethylenediamine in the reaction molar ratio of 2/3 (cyanuric chloride/ethylenediamine) as the nitrogen-containing organic compound (B) and 17% by weight of a powder of water-insoluble ammonium polyphosphate (C3) having been crosslinked by the reaction with formaldehyde as the powder of ammonium polyphosphate (C), to prepare pellets. Using the pellets, the oxygen index and the flame retardance were measured in the same manner as described in Example 1 to evaluate the primary flame retardance formulation. The results are set forth in Table 4.

Example 27

The procedure of Example 23 was repeated except for using 2.0% by weight of aluminum oxide (A1) as the oxygen-containing solid compound (A), 5% by weight of a product (B2) obtained by reacting cyanuric chloride with ethylenediamine in the reaction molar ratio of 2/3 (cyanuric chloride/ethylenediamine) as the nitrogen-containing organic compound (B) and 17% by weight of a powder of water-insoluble ammonium polyphosphate (C3) having been crosslinked by the reaction with formaldehyde as the powder of ammonium polyphosphate (C), to prepare pellets. Using the pellets, the oxygen index and the flame retardance were measured in the same manner as described in Example 1 to evaluate the primary flame retardance formulation. The results are set forth in Table 4.

Example 28

Into a 5-liter kneader (equipped with a heating-mixing means and a deaeration means) were introduced 1,000 g of melamine-coated ammonium polyphosphate (C2) and 64.3 g of a formaldehyde aqueous solution (concentration: 37% by weight), and they were mixed at room temperature. Then, the temperature of the kneader was elevated to 100° C. and kept at the same temperature for 1 hour with deaerating, to obtain 1,010 g of water-insoluble ammonium polyphosphate (C3) in which the melamine molecules present on the surface of the powder of the melamine-coated ammonium polyphosphate (C2) were crosslinked with the aldehyde group (—CHO) to water-insolubilize the melamine-coated ammonium polyphosphate (C2). The mean particle diameter of the water-insoluble ammonium polyphosphate (C3) and the content of the water-soluble component were measured. The results are set forth in Table 5.

Using the water-insoluble ammonium polyphosphate (C3), a flame-retardant polymer composition was prepared in the same manner as described in Example 15. From the composition, a specimen was formed. The specimen was measured with regard to the Izod impact strength and the Dupont impact strength. The results are set forth in Table 5.

Example 29

The procedure of Example 23 was repeated except for varying the amount of the formaldehyde aqueous solution to 129 g, to obtain 1,020 g of water-insoluble ammonium polyphosphate (C3). The mean particle diameter of the water-insoluble ammonium polyphosphate (C3) and the content of the water-soluble component were measured. The results are set forth in Table 5.

Using the water-insoluble ammonium polyphosphate (C3), a flame-retardant polymer composition was prepared in the same manner as described in Example 15. From the composition, a specimen was formed. The specimen was measured with regard to the Izod impact strength and the Dupont impact strength. The results are set forth in Table 5.

Example 30

Into a 5-liter kneader (equipped with a heating-mixing means and a deaeration means) were introduced 1,000 g of melamine-coated ammonium polyphosphate (C2) and 64.3 g of a formaldehyde aqueous solution (concentration: 37% by weight), and they were mixed at room temperature. Then, the temperature of the kneader was elevated to 150° C. and kept at the same temperature for 0.5 hour with deaerating, to obtain 1,010 g of water-insoluble ammonium polyphosphate (C3) in which the melamine molecules present on the surface of the powder of the melamine-coated ammonium polyphosphate (C2) were crosslinked with the aldehyde group (—CHO) so as to water-insolubilize the melamine-coated ammonium polyphosphate (C2). The mean particle diameter of the water-insoluble ammonium polyphosphate (C3) and the content of the water-soluble component were measured. The results are set forth in Table 5.

Example 31

Into a 5-liter glass flask (equipped with a heating-mixing means and a deaeration means) were introduced 1,000 g of melamine-coated ammonium polyphosphate (C2), 64.3 g of a formaldehyde aqueous solution (concentration: 37% by weight), 909 g of water and 90.9 g of methyl alcohol, and they were mixed at room temperature. Then, the flask was heated to 80° C. and kept at the same temperature for 1 hour in the reflux state, followed by filtration, to obtain a solid. The solid was transferred into a dryer and dried at 100° C. for 1 hour to obtain 1,010 g of water-insoluble ammonium polyphosphate (C3). The mean particle diameter of the water-insoluble ammonium polyphosphate (C3) and the content of the water-soluble component were measured. The results are set forth in Table 5.

Example 32

The procedure of Example 26 was repeated except for varying the amount of the formaldehyde aqueous solution to 129 g, to obtain 1,020 g of water-insoluble ammonium polyphosphate (C3). The mean particle diameter of the water-insoluble ammonium polyphosphate (C3) and the content of the water-soluble component were measured. The results are set forth in Table 5.

Example 33

Into a 5-liter glass flask (equipped with a heating-mixing means and a deaeration means) were introduced 1,000 g of melamine-coated ammonium polyphosphate (C2), 92 g of glyoxal (concentration: 49% by weight) and 90.9 g of methyl alcohol, and they were mixed at room temperature. Then, the flask was heated to 80° C. and kept at the same temperature for 1 hour in the reflux state, followed by filtration, to obtain a solid. The solid was transferred into a dryer and dried at 100° C. for 1 hour to obtain 1,025 g of water-insoluble ammonium polyphosphate (C4). The mean particle diameter of the water-insoluble ammonium polyphosphate (C4) and the content of the water-soluble component were measured. The results are set forth in Table 5.

Example 34

Into a 5-liter glass flask (equipped with a heating-mixing means and a deaeration means) were introduced 1,000 g of melamine-coated ammonium polyphosphate (C2), 92 g of 1,6-diisocyanatehexane, 2.6 g of NIKKAOCTHIK "SN" and 900 g of toluene, and they were mixed at room temperature. Then, the flask was heated to 120° C. and kept at the same temperature for 2 hours in the reflux state, followed by filtration, to obtain a solid. The solid was transferred into a dryer and dried at 120° C. for 1 hour to obtain 1,010 g of water-insoluble ammonium polyphosphate (C5). The mean particle diameter of the water-insoluble ammonium polyphosphate (C5) and the content of the water-soluble component were measured. The results are set forth in Table 5.

Example 35

Into a 5-liter glass flask (equipped with a heating-mixing means and a deaeration means) were introduced 900 g of melamine-coated ammonium polyphosphate (C2) and a mixed solvent consisting of 600 g of water and 400 g of methyl alcohol, and they were mixed at room temperature. Then, a methylol melamine solution separately prepared [solution obtained by adding 160 g of a formaldehyde solution (concentration: 37% by weight) to 100 of melamine and dissolving the melamine in the solution with stirring for 1 hour) was added, and pH of the system was adjusted to 4.5.

The resulting mixture was reacted at 75° C. for 2 hours to resinify the methylol melamine. Then, the reaction system was cooled to room temperature, followed by filtration, to obtain a solid. The solid was transferred into a dryer and dried at 100° C. for 1 hour, to obtain 1,025 g of water-insoluble ammonium polyphosphate (C5). This water-insoluble ammonium polyphosphate (C5) was prepared by resinifying the melamine molecules present on the surface of the melamine-coated ammonium polyphosphate powder (2) through crosslinking reaction to water-insolubilize the melamine-coated ammonium polyphosphate powder (2). The mean particle diameter of the water-insoluble ammonium polyphosphate (C5) and the content of the water-soluble component were measured. The results are set forth in Table 5.

Comparative Example 9

A mixture of 1,150 g.mol of ammonium phosphate (C1), 601 g of urea and 631 g of melamine was introduced into a kneader (equipped with a heating means and kept at 270° C.) was introduced as a starting material, and it was burned at the same temperature for 1.5 hours in an ammonia gas atmosphere, to obtain 1,540 g of modified ammonium polyphosphate (C10). The mean particle diameter of the modified ammonium polyphosphate (C10) and the content of the water-soluble component were measured. The results are set forth in Table 5.

Using the modified ammonium polyphosphate (C10), a flame-retardant polymer composition was prepared in the same manner as described in Example 15. From the composition, a specimen was formed. The specimen was measured with regard to the Izod impact strength and the Dupont impact strength. The results are set forth in Table 5.

Comparative Example 10

Into a 5-liter glass flask (equipped with a heating-stirring means and a deaeration means) was initially introduced a mixed solvent consisting of 1,200 g of water and 300 g of methyl alcohol. To the flask were further introduced 1,000 g of commercially available ammonium polyphosphate (C7) |trade name: EXOLIT-422, available from Hechist Co.), 100 g of a melamine/formaldehyde precondensate |trade name: NIKKARESIN S-305, available from Nippon Carbide Industries Co., Ltd.) and 5 g of a curing catalyst |trade name: Catanit A, available from Nitto Chemical Industry Co., Ltd.) to prepare a suspension.

The suspension was heated to 83° C. and reacted at the same temperature for 1 hour. Then, the reaction solution was cooled and filtered to obtain a solid. The solid was washed with methyl alcohol and dried at 100° C. in a nitrogen atmosphere. Thus, 1,050 g of ammonium polyphosphate (C8) having been coated with a melamine-formaldehyde resin on the surface was obtained. The mean particle diameter of the ammonium polyphosphate (C8) and the content of the water-soluble component were measured. The results are set forth in Table 5.

Using the ammonium polyphosphate (C8), a flame-retardant polymer composition was prepared in the same manner as described in Example 15. From the composition, a specimen was formed. The specimen was measured with regard to the Izod impact strength and the Dupont impact strength. The results are set forth in Table 5.

Comparative Example 11

Into a 5-liter glass flask (equipped with a heating-stirring means and a deaeration means) were introduced 1,000 g of commercially available ammonium polyphosphate (C7) |trade name: EXOLIT-422, available from Hechist Co.) and a mixed solvent consisting of 120 g of water and 300 g of methyl alcohol, and they were mixed at room temperature.

Then, a methylol melamine solution separately prepared [solution obtained by adding 160 g of formalin (concentration: 37% by weight) to 100 of melamine and dissolving the melamine in the solution with stirring at 70° C. for 1 hour] was added, and pH of the system was adjusted to 4.5. The resulting mixture was reacted at 83° C. for 1 hour to resinify the methylol melamine. After cooling, the reaction solution was dried at 100° C. in a nitrogen atmosphere. Thus, 1,080 g of ammonium polyphosphate (C8) having been coated with a melamine-formaldehyde resin on the surface was obtained. The mean particle diameter of the ammonium polyphosphate (C8) and the content of the water-soluble component were measured. The results are set forth in Table 5.

Comparative Example 12

Into a 5-liter kneader (equipped with a heating-mixing means and a deaeration means) were introduced 1,000 g of melamine-coated ammonium polyphosphate (C2) and 64.3 g of a formaldehyde aqueous solution (concentration: 37% by weight), and they were mixed at room temperature. Then, the flask was heated to 50° C. and kept at the same temperature for 1 hour with deaerating. As a result, a crosslinked structure was not formed on the surface of the melamine-coated ammonium polyphosphate (C2) powder. The mean particle diameter of the melamine-coated ammonium polyphosphate (C2) and the content of the water-soluble component were measured. The results are set forth in Table 5.

Comparative Example 13

Into a 5-liter kneader (equipped with a heating-mixing means and a deaeration means) were introduced 1,000 g of melamine-coated ammonium polyphosphate (C2) and 64.3 g of a formaldehyde aqueous solution (concentration: 37% by weight), and they were mixed at room temperature. Then, the kneader was heated to 250° C. and kept at the same temperature for 1 hour with deaerating. As a result, it was confirmed that though a crosslinked structure was formed on the surface of the melamine-coated ammonium polyphosphate (C2) powder, elimination of ammonia molecules from the crosslinked structure formed on the surface of the powder took place. That is, the resulting powder had no hydrolytic stability of the desired level. The mean particle diameter of the powder obtained and the content of the water-soluble component were measured. The results are set forth in Table 5.

Comparative Example 14

Into a 5-liter kneader (equipped with a heating-mixing means and a deaeration means) were introduced 1,000 g of melamine-coated ammonium polyphosphate (C2), 6.4 g of a formaldehyde aqueous solution (concentration: 37% by weight), 909 g of water and 90.9 g of methyl alcohol, and they were mixed at room temperature. Then, the kneader was heated to 100° C. and kept at the same temperature for 1 hour with deaerating, followed by filtration. Thus, 1,002 g of a powder of water-insoluble ammonium polyphosphate (C11) in which a crosslinked structure was formed among the melamine molecules present on the surface of the melamine-coated ammonium polyphosphate (C2) powder was obtained. The mean particle diameter of the powder (C11) and the content of the water-soluble component were measured. The results are set forth in Table 5.

Comparative Example 15

Into a 5-liter kneader (equipped with a heating-mixing means and a deaeration means) were introduced 1,000 g of melamine-coated ammonium polyphosphate (C2), 6.4 g of a formaldehyde aqueous solution (concentration: 37% by weight), 909 g of water and 90.9 g of methyl alcohol, and they were mixed at room temperature. Then, the kneader was heated to 80° C. and kept at the same temperature for 1 hour in the reflux state, followed by filtration, to obtain a solid. The solid was transferred into a dryer and dried at 100° C. for 1 hour. Thus, 1,002 g of a powder of water-insoluble ammonium polyphosphate (C11) in which a crosslinked structure was formed among the melamine molecules present on the surface of the melamine-coated ammonium polyphosphate (C2) powder was obtained. The mean particle diameter of the powder (C11) and the content of the water-soluble component were measured. The results are set forth in Table 5.

Comparative Example 16

Into a 5-liter bench kneader (equipped with a heating-mixing means and a deaeration means) was introduced a mixture consisting of 660 g (5 mol) of diammonium phosphate and 710 g (5 mol) of phosphorus pentaoxide with keeping a nitrogen gas atmosphere, and the mixture was stirred for 20 minutes. Then, to the mixture was added 195 g of an urea aqueous solution (concentration: 76.9% by weight) by spraying, and they were burned at 270° C. for 2.5 hours in an ammonia atmosphere to obtain 1,460 g of ammonium polyphosphate (crystal form II) (C6). The mean particle diameter of the powder (C6) and the content of the water-soluble component were measured. The results are set forth in Table 5.

Comparative Example 17

Into a 5-liter kneader (preheated to 280° C.) were introduced 1,800 g of an ammonium polyphosphate powder prepared in accordance with Comparative Example 16 and 200 g of melamine, and they were mixed under heating at 280° C. This mixing was carried out without varying the form of the starting ammonium polyphosphate, and as a result, 2,000 g of melamine-coated ammonium polyphosphate (C6) was obtained. The mean particle diameter of the powder (C6) and the content of the water-soluble component were measured. The results are set forth in Table 5.

Results of measurement

The ammonium polyphosphate powder obtained in each of Examples 28 to 35 and Comparative Examples 9 to 17 was measured on the mean particle diameter and the hydrolytic stability. The results are set forth in Table 5.

In addition to the measurement of the mean particle diameter, the ammonium polyphosphate powder obtained in each of Example 28, Example 29, Comparative Example 9 and Comparative Example 10 was molded into a specimen, and the specimen was subjected to the Izod impact test and the Dupont method drop-weight impact test. The results are set forth in Table 5.

The powder of the water-insoluble ammonium polyphosphate (C3) obtained in Example 28 was observed by the infrared spectrophotometry, and the result is shown in FIG. 1. The powder of the melamine-coated ammonium polyphosphate (C2) used as a starting material was observed by the infrared spectrophotometry, and the result is shown in FIG. 2.

Figure 2:
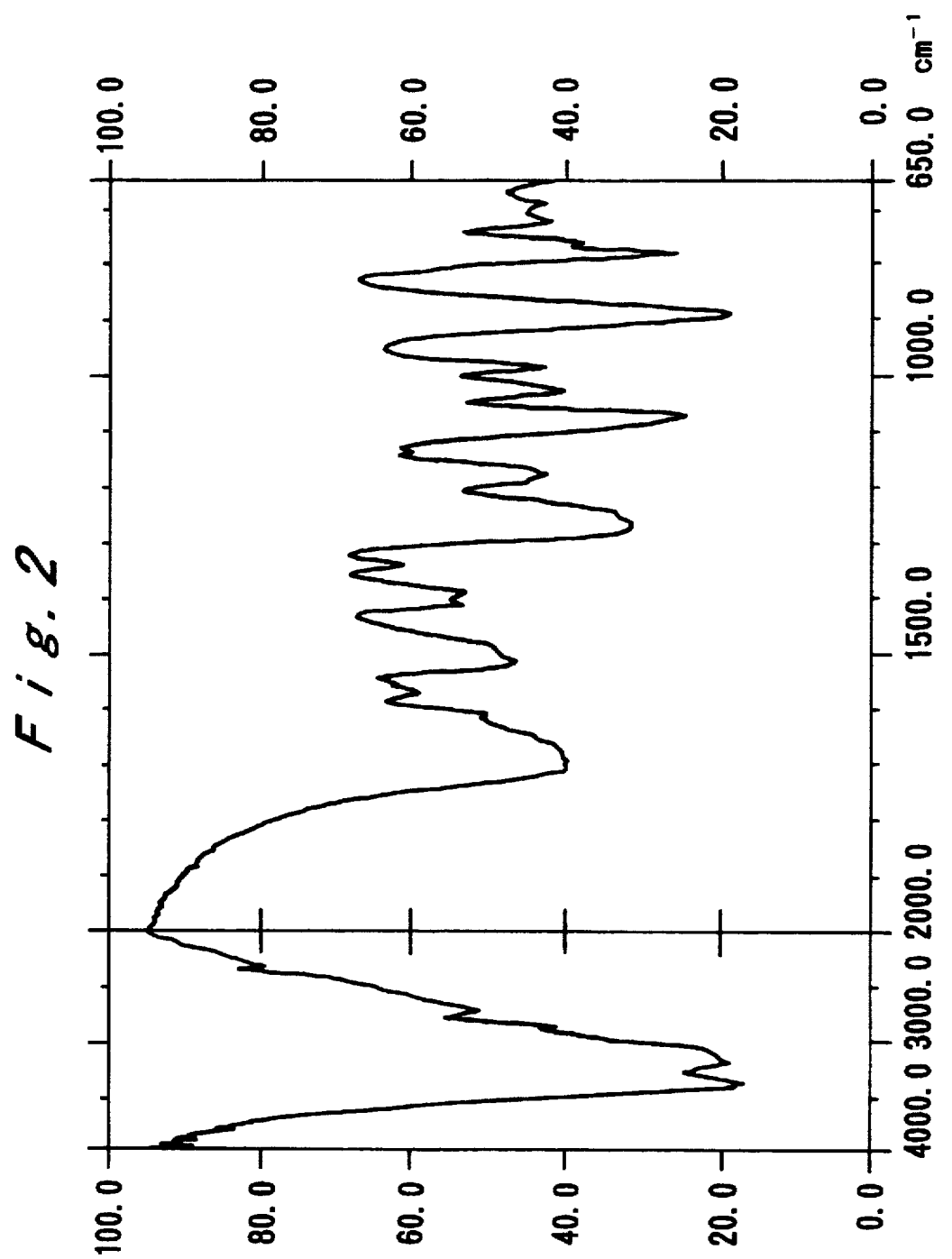
FIG. 2 shows an infrared spectrum of a surface of a melamine-coated ammonium polyphosphate powder used in other examples.

FIG. 1 and FIG. 2 are each an infrared spectrum of the surface of the water-insoluble ammonium polyphosphate powder. In both figures, the wave number is plotted as abscissa (unit: $cm^{-1}$) and the transmittance of the infrared rays is plotted as ordinate.

In FIG. 1, absorption at 1,180 $cm^{-1}$ caused by the methylene bond derived from the crosslinked structure on the particle surface is observed. This absorption is caused by the twisting and wagging vibration of the C—H bond.

FIG. 2 is an infrared spectrum of the surface of the water-insoluble melamine-coated ammonium polyphosphate powder. In FIG. 2, absorption at 1,180 $cm^{-1}$ observed in FIG. 1 is not observed.

TABLE 1

| | Component of Flame-retardant Resin Composition | | | | | |
|---|---|---|---|---|---|---|
| | A | | | B | C | |
| | Kind | Amount % | Mean particle diameter (μm) | B1 % B2 % | C1 % | C2 % |
| Ex.1 | Magnesium oxide | 1.0 | 5.6 | 5 — | 17 | — |
| Ex.2 | Magnesium oxide | 0.5 | 5.6 | 5 — | 17 | — |
| Ex.3 | Aluminum oxide | 3.0 | 3.7 | 5 — | 17 | — |
| Ex.4 | Aluminum oxide | 1.0 | 3.7 | 5 — | 17 | — |
| Ex.5 | Magnesium | 1.0 | 1.7 | 5 — | 17 | — |

TABLE 1-continued

| | | Amount % | Mean particle diameter (μm) | B1 % | B2 % | C1 % | C2 % |
|---|---|---|---|---|---|---|---|
| Ex.6 | hydroxide Talc | 1.0 | 2.8 | 5 | — | 17 | — |
| Ex.7 | Calcium metasilicate | 1.0 | 4.3 | 5 | — | 17 | — |
| Ex.8 | Magnesium silicate | 1.0 | 1.2 | 5 | — | 17 | — |
| Ex.9 | Basic magneisum carbonate | 1.0 | 2.4 | 5 | — | 17 | — |
| Comp. Ex.1 | Magnesium sulfate | 1.0 | un-measurable | 5 | — | 17 | — |
| Comp. Ex.2 | Calcium sulfate | 1.0 | un-measurable | 5 | — | 17 | — |
| Comp. Ex.3 | Magnesium hydroxide | 7.0 | 1.7 | 5 | — | 17 | — |

| | Component of Flame-retardant Resin Composition D | | | | | Additives | Flame Retardance Oxygen Index (O.I.) 3.0 mm-thick | UL 94V 1.2 mm-thick |
|---|---|---|---|---|---|---|---|---|
| | D1 % | D2 % | D3 % | D4 | D5 | | | |
| Ex.1 | 56.5 | 10 | 10 | — | — | 0.5 | 33.2 | V-O |
| Ex.2 | 57.0 | 10 | 10 | — | — | 0.5 | 32.0 | V-O |
| Ex.3 | 54.5 | 10 | 10 | — | — | 0.5 | 34.3 | V-O |
| Ex.4 | 56.5 | 10 | 10 | — | — | 0.5 | 33.8 | V-O |
| Ex.5 | 56.5 | 10 | 10 | — | — | 0.5 | 32.5 | V-O |
| Ex.6 | 56.5 | 10 | 10 | — | — | 0.5 | 33.0 | V-O |
| Ex.7 | 56.5 | 10 | 10 | — | — | 0.5 | 32.8 | V-O |
| Ex.8 | 56.5 | 10 | 10 | — | — | 0.5 | 32.1 | V-O |
| Ex.9 | 56.5 | 10 | 10 | — | — | 0.5 | 33.2 | V-O |
| Comp. Ex.1 | 56.5 | 10 | 10 | — | — | 0.5 | 30.2 | not examined |
| Comp. Ex.2 | 56.5 | 10 | 10 | — | — | 0.5 | 29.0 | not examined |
| Comp. Ex.3 | 50.5 | 10 | 10 | — | — | 0.5 | 21.0 | not examined |

B1: Homopolymer having 2-piperazinylene-4-morpholino-1,3,5-triazine as its consitutent unit (decomposition temperature: about 304° C., true density: 1.3 g/cc)

C1: Ammonium polyphosphate (crystal form II)

D1: Propylene-ethylene block copolymer [ethylene content: 8.5 wt. %, MFR (230° C., 2.16 kgf): 20 g/10 min]

D2: Polyethylene resin [MI(190° C., 2.16 kgf): 6.5 g/10 min, density: 0.952 g/cc, melting point(Tm): 130° C.]

D3: Ethylene-propylene rubber [trade name: EP-02, available from Japan Synthetic Rubber Co., Ltd.]

TABLE 2

| | Component of Flame-retardant Resin Composition A | | | B | | C | |
|---|---|---|---|---|---|---|---|
| | Kind | Amount % | Mean particle diameter (μm) | B1 % | B2 % | C1 % | C2 % |
| Ex.10 | Magnesium oxide | 1.0 | 5.6 | 5 | — | — | 17 |
| Ex.11 | Aluminum oxide | 1.0 | 3.7 | 5 | — | — | 17 |
| Ex.12 | Aluminum oxide | 1.0 | 3.7 | — | 5 | 17 | — |
| Ex.13 | Magnesium hydroxide | 1.0 | 1.7 | 9 | — | 24 | — |
| Ex.14 | Magnesium hydroxide | 1.0 | 1.7 | 10 | — | 26 | — |
| Comp. Ex.4 | — | — | — | 9 | — | 24 | — |
| Comp. Ex.5 | — | — | — | 10 | — | 26 | — |

| | Component of Flame-retardant Resin Composition D | | | | | Additives | Flame Retardance Oxygen Index (O.I.) 3.0 mm-thick | UL 94V 1.2 mm-thick |
|---|---|---|---|---|---|---|---|---|
| | D1 % | D2 % | D3 % | D4 | D5 | | | |
| Ex.10 | 56.5 | 10 | 10 | — | — | 0.5 | 33.7 | V-O |
| Ex.11 | 56.5 | 10 | 10 | — | — | 0.5 | 35.0 | V-O |
| Ex.12 | 56.5 | 10 | 10 | — | — | 0.5 | 34.7 | V-O |
| Ex.13 | — | — | — | 65.5 | — | 0.5 | 37.5 | V-O |
| Ex.14 | — | — | — | — | 62.5 | 0.5 | 33.4 | V-O |
| Comp. Ex.4 | — | — | — | 66.5 | — | 0.5 | 35.0 | not examined |
| Comp. Ex.5 | — | — | — | — | 63.5 | 0.5 | 30.6 | not examined |

B1 and C1 are the same as in Table 1.

B2: Reaction product obtained by reacting cyanuric chloride with ethylenediamine in the molar ratio of 2/3 (cyanuric chloride/ethylenediamine)

C2: Melamine-coated ammonium polyphosphate

D1, D2 and D3 are the same in Table 1.

D4: Low-density polyethylene [MI(190° C., 2.16 kgf): 3 g/10 min, density: 0.924 g/cc, trade name: PETROCEN 186, available from Toso Corporation]

D5: Polystyrene resin [MI(190° CC., 2.16 kgf): 1.7 g/10 min, density: 1.05 g/cc, trade name: STYRON 475S, available from Asahi Chemical Industry Co., Ltd.]

TABLE 3

Flame-retardant Polymer Composition
Kind and Amount of Components (% by wt.)

| | Kind | Amount (% by wt.) | Kind | Amount (% by wt.) | Kind | Amount (% by wt.) | Additive Amount |
|---|---|---|---|---|---|---|---|
| Ex.15 | C3 | 20 | B1 | 10 | D1 | 69.5 | 0.5 |
| Ex.16 | C3 | 20 | B2 | 10 | D1 | 69.5 | 0.5 |
| Ex.17 | C3 | 20 | B3 | 10 | D1 | 69.5 | 0.5 |
| Ex.18 | C3 | 20 | B4 | 10 | D1 | 69.5 | 0.5 |
| Ex.19 | C4 | 20 | B1 | 10 | D1 | 69.5 | 0.5 |
| Ex.20 | C5 | 20 | B1 | 10 | D1 | 69.5 | 0.5 |
| Ex.21 | C3 | 24 | B4 | 9 | D2 | 66.5 | 0.5 |
| Ex.22 | C3 | 26 | B1 | 10 | D3 | 63.5 | 0.5 |
| Comp. Ex.6 | C6 | 20 | B1 | 10 | D1 | 69.5 | 0.5 |
| Comp. Ex.7 | C7 | 20 | B1 | 10 | D1 | 69.5 | 0.5 |
| Comp. Ex.8 | C8 | 20 | B1 | 10 | D1 | 69.5 | 0.5 |

Properties and Evaluations of Molded Articles from the Flame-retardant Polymer Composition

| | Bleed Resistance | | Lasting Period under High Temper. and High Humidity | General Evaluation | Flame Retardance UL94V |
|---|---|---|---|---|---|
| | Surface Electrical Resistance of Hot Water Treatment | | | | |
| | Before treat. ($\Omega$) | After treat. ($\Omega$) | (days) | | 1.6 mm |
| Ex.15 | $5.9 \times 10^{17}$ | $8.8 + 10^{17}$ | 40 days or more | E | V-O |
| Ex.16 | $7.3 \times 10^{16}$ | $6.1 + 10^{16}$ | 30 days | G | V-O |
| Ex.17 | $3.5 \times 10^{16}$ | $4.1 + 10^{16}$ | 40 days or more | E | V-O |
| Ex.18 | $9.3 \times 10^{16}$ | $2.2 + 10^{16}$ | 40 days or more | E | V-O |
| Ex.19 | $2.9 \times 10^{16}$ | $7.7 + 10^{16}$ | 30 days | G | V-O |
| Ex.20 | $2.8 \times 10^{16}$ | $3.7 + 10^{16}$ | 30 days | G | V-O |
| Ex.21 | $6.9 \times 10^{16}$ | $7.1 + 10^{17}$ | 40 days or more | E | V-O |
| Ex.22 | $2.4 \times 10^{16}$ | unmeasurable* | 30 days | G | V-O |
| Comp. Ex.6 | $4.0 \times 10^{17}$ | $6.7 + 10^{10}$ | 14 days or less | B | V-O |
| Comp. Ex.7 | $2.7 \times 10^{16}$ | $1.6 + 10^{9}$ | 7 days or less | W | V-O |
| Comp. Ex.8 | $8.7 \times 10^{16}$ | $3.4 + 10^{10}$ | 14 days or less | B | V-O |

C3: HCHO-crosslinked water-insoluble ammonium polyphosphate
C4: NCO-crosslinked water-insoluble ammonium polyphosphate
C5: Glyoxal-crosslinbked water-insoluble ammonium polyphosphate
C6: Ammonium polyphosphate (crystal form II)
C7: Commercially available amonium polyphosphate
C8: Melamine resin-coated ammonium polyphosphate
B1: Homopolymer of 2-piperazinylene-4-morpholino-1,3,5-triazine
B2: Homopolymer of 2-piperazinylene-4-N,N-(2-hydroxyethyl)amino-1,3,5-triazine
B3: Copolymer of 2-piperazinylene-4-morpholino-1,3,5-triazine in the equimolar ratio
B4: Reaction product of cyanuric chloride with ethylenediamine (2:3)
D1: P-E copolymer [E content: 8.5 wt. %, MFR (230° C., 2.16 kgf): 20 g/10 min]
D2: LDPE [trade name: PETROCEN 186, available from Toso Corp.]
D3: Polystyrene resin [trade name: STYRON 475S, available from Asahi Chemical Industry Co., Ltd.]
*: Caused by marked heat distortion in hot water
E: excellent, G: good, B: bad, W: worst

TABLE 4

| | Component of Flame-retardant Resin Composition | | | | | | | |
|---|---|---|---|---|---|---|---|---|
| | A | | | B | | C | | |
| | Kind | Amount % | Mean particle diameter (μm) | B1 % | B2 % | C1 % | C2 | C3 |
| Ex.23 | Magnesium oxide | 0.5 | 5.6 | 5 | — | — | — | 17 |
| Ex.24 | Aluminum oxide | 1.0 | 3.7 | 5 | — | — | — | 17 |
| Ex.25 | Magneisum hydroxide | 2.0 | 1.7 | — | 5 | — | — | 17 |
| Ex.26 | Magnesium hydroxide | 1.0 | 5.6 | — | 5 | — | — | 17 |
| Ex.27 | Magnesium hydroxide | 2.0 | 3.7 | — | 5 | — | — | 17 |

| | Component of Flame-retardant Resin Composition | | | | | Flame Retardance | |
|---|---|---|---|---|---|---|---|
| | D | | | | | Oxygen Index | UL |
| | D1 % | D2 % | D3 % | D4 | D5 | Addit-ives | (O.I.) | 94V |
| | | | | | | | 3.0 mm-thick | 1.2 mm-thick |
| Ex.23 | 57.0 | 10 | 10 | — | — | 0.5 | 33.5 | V-O |
| Ex.24 | 56.5 | 10 | 10 | — | — | 0.5 | 34.1 | V-O |
| Ex.25 | 55.5 | 10 | 10 | — | — | 0.5 | 33.2 | V-O |
| Ex.26 | 56.5 | 10 | 10 | — | — | 0.5 | 34.6 | V-O |
| Ex.27 | 55.5 | 10 | 10 | — | — | 0.5 | 34.7 | V-O |

B1 and C1 are the same as in Table 1.
B2: Product obtained by reacting cyanuric chloride with ethylenediamine in the molar ratio of 2/3 (cyanuric chloride/ethylenediamine)
C3: Water-insoluble ammonium polyphosphate
D1, D2 and D3 are the same in Table 1.

TABLE 5

| | Water-insoluble Ammonium Polyphosphate Mean particle Diameter and Water-soluble Content (wt. %) | | | | Molded Article from the Composition | |
|---|---|---|---|---|---|---|
| | Mean Particle Diameter | Temperature and Content (wt. %) | | | Izod Impact Strength | Dupont Impact Strength |
| | μm | 25° C. | 50° C. | 75° C. | (kg.cm/cm) | (10° C.) |
| Ex.28 | 6.8 | 1.0 | 3.0 | 7.0 | 5.5 | 80 |
| Ex.29 | 6.8 | 1.0 | 3.0 | 7.0 | 5.5 | 80 |
| Ex.30 | 6.8 | 1.0 | 3.0 | 7.0 | | |
| Ex.31 | 6.8 | <0.1 | 0.5 | 1.5 | | |
| Ex.32 | 6.8 | <0.1 | 0.5 | 1.5 | | |
| Ex.33 | 6.8 | 1.0 | 2.0 | 5.0 | | |
| Ex.34 | 6.8 | 1.0 | 2.0 | 5.0 | | |
| Ex.35 | 6.8 | <0.1 | 0.7 | 3.5 | | |
| Comp. Ex.9 | 30 | 8.0 | 40 | 100 | 3.5 | 20 |
| Comp. Ex.10 | 30 | 1.2 | 3.8 | 24 | 3.5 | 20 |
| Comp. Ex.11 | 20 | 5.0 | 23 | 64 | | |
| Comp. Ex.12 | 6.8 | 1.7 | 7.3 | 58 | | |
| Comp. Ex.13 | 6.8 | 2.0 | 8.2 | 62 | | |
| Comp. Ex.14 | 6.8 | 1.4 | 4.8 | 36 | | |
| Comp. Ex.15 | 6.8 | 1.2 | 3.5 | 22 | | |
| Comp. Ex.16 | 6.4 | 18 | 51 | 100 | | |
| Comp. Ex.17 | 6.8 | 1.7 | 7.3 | 58 | | |

EFFECT OF THE INVENTION

The thermoplastic polymer composition of the invention containing a flame retardant, which is prepared in accordance with the primary flame retardance formulation and shows high flame retardance even if the flame retardant is used in a small amount, exerts the following effects.

(1) In spite of a low content of the flame retardant, the flame-retardant polymer composition prepared in accordance with the primary flame retardance formulation exhibits high flame retardance.

(2) The flame-retardant polymer composition prepared in accordance with the primary flame retardance formulation can provide favorable materials used in fields of electrical appliances, building industry, automobile parts, etc.

The flame-retardant polymer composition of the invention containing water-insoluble ammonium polyphosphate (C3–C5) as a main flame retardant, which is prepared in accordance with the secondary flame retardance formulation, exerts the following effects.

(3) The molded article obtained from the flame-retardant polymer composition prepared in accordance with the secondary flame retardance formulation is remarkably improved in the bleed resistance under the conditions of high temperature and high humidity. (The bleed resistance was evaluated by variation of resistance value in hot water immersion and a lasting period under the conditions of high temperature and high humidity).

(4) The molded article obtained from the flame-retardant polymer composition prepared in accordance with the secondary flame retardance formulation is also improved in the flame retardance.

(5) A decomposition gas is hardly generated not only when the flame-retardant polymer composition prepared in accordance with the secondary flame retardance formulation is molded into an article but also when the molded article is exposed to flame.

(6) The molded article obtained from the flame-retardant polymer composition prepared in accordance with the secondary flame retardance formulation is suitable for electrical appliances.

(7) The molded article obtained from the flame-retardant polymer composition prepared in accordance with the tertiary flame retardance formulation exerts both effects by the primary flame retardance formulation and the secondary flame retardance formulation.

(8) According to the process of the invention, a water-insoluble ammonium polyphosphate powder essential to the preparation of the flame-retardant polymer composition of the secondary flame retardance formulation can be readily obtained.

What is claimed is:

1. A flame-retardant thermoplastic polymer composition comprising;
   (A) a solid oxygen-containing metal compound including at least one element selected from the group consisting of Ca, Ba, Sr, Mg, Al, Si, Zn, Cd, Ti, Zr and Sn, and wherein said solid oxygen-containing metal compound is at least one compound selected from the group consisting of a hydroxide, a basic carbonate, a carbonate, a carbonate hydrate, a silicate, a silicate hydrate, an oxide, and an oxide hydrate, said solid oxygen-containing metal compound in an amount of 0.1 to 5% by weight,
   (B) a nitrogen-containing organic compound selected from the group consisting of a homopolymer and a copolymer, wherein each of said homopolymer and said copolymer comprises units represented by the following formula (II):

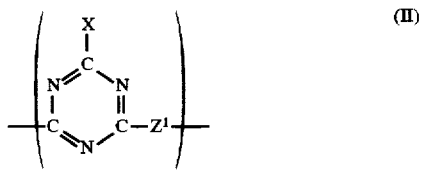

wherein X and $Z^1$ are each a group bonded to a triazine skeleton through a nitrogen atom; X is an alkylamino group represented by —$NHR^1$ or —$NR^2R^3$, wherein $R^1$, $R^2$ and $R^3$ are each independently a linear or branched alkyl group having 1 to 6 carbon atoms, a morpholino group, a piperidino group or a hydroxyalkylamino group represented by —$NHR^4$ or —$NR^5R^6$, wherein $R^4$, $R^5$ and $R^6$ are each independently a linear or branched hydroxyalkyl group having 2 to 6 carbon atoms; and $Z^1$ is a divalent group selected from the group consisting of piperazine, —$HN(CH_2)_m$NH— wherein m is a number of 2 to 6, and —$NR^7(CH_2)_nR^8N$— wherein n is a number of 2 to 6, and wherein one of said $R^7$ and $R^8$ is a hydroxyethyl group, said nitrogen-containing compound in an amount of 0.1 to 20% by weight,
   (C) at least one powder selected from the group consisting of a melamine-coated ammonium polyphosphate powder obtained by adding or adsorbing melamine on surfaces of ammonium polyphosphate powder to chemically link a melamine coating to the ammonium polyphosphate powder via an oxygen-proton bond of a polyphosphoric acid derived from the ammonium polyphosphate powder, and a water-insoluble ammonium polyphosphate powder obtained by adding or adsorbing melamine on surfaces of ammonium polyphosphate powder to chemically link a melamine coating to the ammonium polyphosphate powder via an oxygen-proton bond of a polyphosphoric acid derived from the ammonium polyphosphate powder, and reacting an active hydrogen on an amine group of the melamine with a crosslinking agent having a functional group reactive to said active hydrogen to produce a crosslinked structure in the melamine coating, said at least one powder in an amount of 10 to 40% by weight, and
   (D) a thermoplastic polymer in an amount of 35 to 88.9% by weight, the total amount of said components (A), (B), (C) and (D) being 100% by weight.

2. The flame-retardant thermoplastic polymer composition as claimed in claim 1, wherein the oxygen-containing metal compound has a mean particle diameter of not more than 10 μm.

3. The flame-retardant thermoplastic polymer composition as claimed in claim 1, wherein the nitrogen-containing organic compound is a product obtained by the reaction of cyanuric chloride with diamine.

4. The flame-retardant thermoplastic polymer composition
   of claim 1, wherein the thermoplastic polymer (D) is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

5. The flame-retardant thermoplastic polymer compositions as claimed in claim 1, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

6. A flame-retardant thermoplastic polymer composition comprising:
   (B) a nitrogen-containing organic compound selected from the group consisting of a homopolymer and a copolymer, wherein each of said homopolymer and said copolymer comprises constituent units represented by the following formula (II):

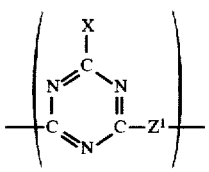

wherein each of X and $Z^1$ has a structure bonded to a triazine ring through a nitrogen atom; X is an alkylamino group represented by —$NHR^1$ or —$NR^2R^3$, wherein $R^1$, $R^2$ and $R^3$ are each independently a linear or branched alkyl group having 1 to 6 carbon atoms, a morpholino group, a piperidino group or a hydroxyalkylamino group represented by at least one of —$NHR^4$ and —$NR^5R^6$ wherein $R^4$, $R^5$ and $R^6$ are each independently a linear or branched hydroxyalkyl group having 2 to 6 carbon atoms; and $Z^1$ is selected from the group consisting of piperazinylene, —$NH(CH_2)_m$NH— wherein m is a number of 2 to 6, and —$NR^7(CH_2)_nR^8N$— wherein n is a number of 2 to 6, and wherein one of said $R^7$ and $R^8$ is a hydroxyethyl group, said nitrogen-containing compound in an amount of 1 to 20% by weight, (C) a water-insoluble ammonium polyphosphate powder in an amount of 10 to 40% by weight, said water-insoluble ammonium polyphosphate powder being obtained by adding or adsorbing melamine on surfaces of the ammonium polyphosphate particles to chemically link a melamine coating to the ammonium polyphosphate particles via an oxygen-proton bond of a polyphosphoric acid derived from the ammonium polyphosphate particles, and reacting an active hydrogen attached to an amino group of the melamine with a crosslinking agent having a functional group reactive to said active hydrogen to produce a crosslinked structure in the melamine coating, and (D) a thermoplastic polymer in an amount of 40 to 89% by weight, the total amount of said components (B), (C) and (D) being 100% by weight.

7. The flame-retardant thermoplastic polymer composition of claim 6, wherein the crosslinking agent includes at least one selected from the group consisting of an isocyanate group, a glycidyl group, a carboxyl group, a methylol group and an aldehyde group.

8. The flame-retardant thermoplastic polymer composition as claimed in claim 6, wherein said added or adsorbed melamine is in an amount of 0.5 to 20% by weight based on said ammonium polyphosphate particles.

9. The flame-retardant thermoplastic polymer compositions as claimed in claim 6, wherein the thermoplastic polymer (D) is at least one selected from the group consisting of aliphatic thermoplastic resins, aromatic thermoplastic resins, aliphatic elastomers, aromatic elastomers, mixtures different elastomers, and mixtures of thermoplastic resins and elastomers or partially cross-linked elastomers.

10. The flame-retardant thermoplastic polymer composition
of claim 9, wherein the thermoplastic polymer (D) is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

11. The flame-retardant thermoplastic polymer compositions as claimed in claim 5, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly (meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

12. The flame-retardant thermoplastic polymer composition of claim 2, wherein the nitrogen-containing organic compound is a product obtained by the reaction of cyanuric chloride with diamine.

13. The flame-retardant thermoplastic polymer composition of claim 2, wherein the thermoplastic polymer (D) is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

14. The flame-retardant thermoplastic polymer composition of claim 6 wherein the thermoplastic polymer (D) is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

15. The flame-retardant thermoplastic polymer composition of claim 2, wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

16. The flame-retardant thermoplastic polymer composition of claim 5, wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

17. The flame-retardant thermoplastic polymer composition of claim 12, wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

18. The flame-retardant thermoplastic polymer composition of claim 4, wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

19. The flame-retardant thermoplastic polymer composition of claim 13 wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

20. The flame-retardant thermoplastic polymer composition of claim 14, wherein the thermoplastic polymer is at least one polymer selected from the group consisting of:

ethylene resins, propylene resins, 1-butene resins and 4-methyl-1-pentene resins, styrene resins, styrene-α-methylstyrene, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

21. The flame-retardant thermoplastic polymer composition of claim 7, wherein said added or absorbed melamine is in an amount of 0.5 to 20% by weight based on said ammonium polyphosphate particles.

22. The flame-retardant thermoplastic polymer composition of claim 7, wherein the thermoplastic polymer (D) is at least one selected from the group consisting of aliphatic thermoplastic resins, aromatic thermoplastic resins, aliphatic elastomers, aromatic elastomers, mixtures different elastomers, and mixtures of thermoplastic resins and elastomers or partially cross-linked elastomers.

23. The flame-retardant thermoplastic polymer composition of claim 8, wherein the thermoplastic polymer (D) is at least one selected from the group consisting of aliphatic thermoplastic resins, aromatic thermoplastic resins, aliphatic elastomers, aromatic elastomers, mixtures different elastomers, and mixtures of thermoplastic resins and elastomers or partially cross-linked elastomers.

24. The flame-retardant thermoplastic polymer composition of claim 21, wherein the thermoplastic polymer (D) is at least one selected from the group consisting of aliphatic thermoplastic resins, aromatic thermoplastic resins, aliphatic elastomers, aromatic elastomers, mixtures different elastomers, and mixtures of thermoplastic resins and elastomers or partially cross-linked elastomers.

25. The flame-retardant thermoplastic polymer composition of claim 7, wherein the thermoplastic polymer (D)

is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

26. The flame-retardant thermoplastic polymer composition of claim 8, wherein the thermoplastic polymer (D)

is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

27. The flame-retardant thermoplastic polymer composition of claim 21, wherein the thermoplastic polymer (D)

is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

28. The flame-retardant thermoplastic polymer composition of claim 9, wherein the thermoplastic polymer (D)

is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

29. The flame-retardant thermoplastic polymer composition of claim 21, wherein the thermoplastic polymer (D)

is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

30. The flame-retardant thermoplastic polymer composition of claim 28, wherein the thermoplastic polymer (D) is at least one selected from the group consisting of 1-olefin homopolymer resins, 1-olefin copolymer resins, polymer resins of vinyl monomers or their derivatives, polyamide resins, mixtures of different polyamide resins, homopolymer resins of aromatic compounds, copolymer resins of aromatic compounds, mixtures of homopolymer and copolymer resins of aromatic compounds, thermoplastic elastomers, mixtures of different thermoplastic elastomers, elastomers, mixtures of different elastomers, addition polymerized elastomers, and condensation polymerized elastomers.

31. The flame-retardant thermoplastic polymer composition of claim 7, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

32. The flame-retardant thermoplastic polymer composition of claim 8, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

33. The flame-retardant thermoplastic polymer composition of claim 21, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

34. The flame-retardant thermoplastic polymer composition of claim 9, wherein the thermoplastic polymer is at least one polymer selected from the group consisting of:

ethylene resins, propylene resins, 1-butene resins and 4-methyl- 1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

35. The flame-retardant thermoplastic polymer composition of claim 22, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

36. The flame-retardant thermoplastic polymer composition of claim 23, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

37. The flame-retardant thermoplastic polymer composition of claim 24, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

38. The flame-retardant thermoplastic polymer composition of claim 10, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

39. The flame-retardant thermoplastic polymer composition of claim 25, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

40. The flame-retardant thermoplastic polymer composition of claim 26, wherein the thermoplastic polymer is at least one polymer selected from the group consisting of ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

41. The flame-retardant thermoplastic polymer composition of claim 27, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

42. The flame-retardant thermoplastic polymer composition of claim 28, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

43. The flame-retardant thermoplastic polymer composition of claim 29, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

44. The flame-retardant thermoplastic polymer composition of claim 30, wherein the thermoplastic polymer is at least one polymer selected from the group consisting of:

ethylene resins, propylene resins, 1-butene resins and 4-methyl-1-pentene resins, styrene resins, styrene-α-methylstyrene resins, poly(meth)acrylic acid resins, poly(meth)acrylic acid derivative resins, polyvinyl chloride resins, polyvinylidene chloride resins, acrylonitrile-butadiene-styrene copolymer resins, 6-nylons, 7-nylons, 6,6-nylons, 6,7-nylons, 6,10-nylons, 6,12-nylons, 6-/-6,6-copolycondensation nylons, m-xylylene-adipic acid nylons, polycarbonate resins, polyethylene terephthalate resins, polybutylene terephthalate resins, polysulfone resins, polyurethane resins, polyphenylene ether resins, mixtures of ethylene-propylene copolymer elastomers and ethylene resins, mixtures of ethylene-propylene copolymer elastomers and propylene resins, mixtures of ethylene-propylene copolymer elastomers and ethylene resins wherein an elastomer component is partially-crosslinked, mixtures of ethylene-propylene copolymer elastomers and propylene resins wherein an elastomer component is partially-crosslinked, ethylene-propylene copolymer elastomers, ethylene-1-butene copolymer elastomers, propylene-1-butene copolymer elastomers, natural rubbers, polybutadiene rubbers, polyisoprene rubbers, isobutene-isoprene copolymer rubbers, butadiene-acrylonitrile copolymer rubbers and chloroprene rubbers.

45. The flame-retardant thermoplastic polymer composition of claim 1, wherein the crosslinking agent includes at least one selected from the group consisting of an isocyanate group, a glycidyl group, a carboxyl group, a methylol group and an aldehyde group.

46. The flame-retardant thermoplastic polymer composition of claim 6, wherein said nitrogen-containing organic compound is a product obtained by the reaction of a cyanuric chloride with a diamine.

* * * * *

UNITED STATES PATENT AND TRADEMARK OFFICE
CERTIFICATE OF CORRECTION

PATENT NO. : 5,795,930
DATED : August 18, 1998
INVENTOR(S) : Fukumura et al.

It is certified that error appears in the above-identified patent and that said Letters Patent is hereby corrected as shown below:

Column 39, Line 60, change "9" to --6--;

Column 40, Line 54, change "6" to --3--.

Signed and Sealed this

Fifteenth Day of December, 1998

Attest:

BRUCE LEHMAN

*Attesting Officer*     Commissioner of Patents and Trademarks